United States Patent
Cho

(10) Patent No.: US 10,048,846 B2
(45) Date of Patent: Aug. 14, 2018

(54) METHOD OF SETTING OPTION WHEN FUNCTION IS PERFORMED BY USING SHORTCUT, AND IMAGE FORMING APPARATUS TO PERFORM THE METHOD

(71) Applicant: S-PRINTING SOLUTION CO., LTD., Suwon-si, Gyeonggi-do (KR)

(72) Inventor: Tae-gyun Cho, Hwaseong-si (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 166 days.

(21) Appl. No.: 13/912,452

(22) Filed: Jun. 7, 2013

(65) Prior Publication Data

US 2014/0096086 A1    Apr. 3, 2014

(30) Foreign Application Priority Data

Sep. 28, 2012 (KR) .................. 10-2012-0109263

(51) Int. Cl.
*G06F 3/0484* (2013.01)
*H04N 1/00* (2006.01)
(Continued)

(52) U.S. Cl.
CPC ...... *G06F 3/04847* (2013.01); *G06F 3/04817* (2013.01); *H04N 1/00411* (2013.01);
(Continued)

(58) Field of Classification Search
CPC .................................................. G06F 3/04847
(Continued)

(56) References Cited

U.S. PATENT DOCUMENTS 7,231,229 B1 * 6/2007 Hawkins ......... H04M 1/274558
345/1.1
2002/0136563 A1    9/2002 Maeda et al.
(Continued)

FOREIGN PATENT DOCUMENTS

CN    101335804    12/2008
CN    101630225    1/2010
(Continued)

OTHER PUBLICATIONS

Extended European Search Report dated Dec. 12, 2014 in European Patent Application No. 13175187.7.
(Continued)

*Primary Examiner* — Andrey Belousov
*Assistant Examiner* — Seth A Silverman
(74) *Attorney, Agent, or Firm* — Staas & Halsey LLP

(57) ABSTRACT

An image forming apparatus including: a user interface unit to provide one or more shortcuts; a storage unit to store shortcut information about functions corresponding to the one or more shortcuts and options related to the functions; a job executing unit; and a control unit to control the job executing unit to perform the function corresponding to the selected shortcut, wherein when the shortcut is selected, the control unit controls the job executing unit to perform the function corresponding to the selected shortcut or controls the user interface unit to display an option setting page to set an option necessary to perform the function corresponding to the selected shortcut.

26 Claims, 16 Drawing Sheets

(51) Int. Cl.
*H04N 1/32* (2006.01)
*G06F 3/0481* (2013.01)

(52) U.S. Cl.
CPC ..... *H04N 1/00424* (2013.01); *H04N 1/00427* (2013.01); *H04N 1/00435* (2013.01); *H04N 1/00472* (2013.01); *H04N 1/00474* (2013.01); *H04N 1/00482* (2013.01); *H04N 1/00503* (2013.01); *H04N 1/32058* (2013.01); *H04N 1/32069* (2013.01); *H04N 2201/0094* (2013.01)

(58) Field of Classification Search
USPC .......................................................... 715/847
See application file for complete search history.

(56) References Cited

U.S. PATENT DOCUMENTS

| | | |
|---|---|---|
| 2005/0240756 A1 | 10/2005 | Mayer |
| 2006/0282790 A1 | 12/2006 | Matthews et al. |
| 2007/0063988 A1 | 3/2007 | Suzuki et al. |
| 2007/0139386 A1 | 6/2007 | Martin et al. |
| 2009/0009806 A1 | 1/2009 | Matsuda |
| 2010/0017731 A1 | 1/2010 | Taira |
| 2010/0079794 A1* | 4/2010 | Kim .............................. 358/1.15 |
| 2010/0180229 A1* | 7/2010 | Lee ....................... G06F 3/0238 715/808 |
| 2010/0238515 A1 | 9/2010 | Kanuma |
| 2011/0080608 A1* | 4/2011 | Do ....................... G06F 3/04883 358/1.15 |
| 2011/0107242 A1 | 5/2011 | Paek et al. |
| 2012/0212761 A1 | 8/2012 | Kuroyanagi |
| 2013/0003099 A1* | 1/2013 | Arakawa ................. G06F 3/048 358/1.13 |

FOREIGN PATENT DOCUMENTS

| | | |
|---|---|---|
| EP | 2472381 | 7/2012 |
| JP | 2000-305701 | 11/2000 |

OTHER PUBLICATIONS

Chinese Office Action dated Nov. 23, 2015 in Chinese Patent Application No. 201310392865.2.

European Office Action dated Apr. 10, 2017 in European Patent Application No. 13175187.7.

\* cited by examiner

METHOD OF SETTING OPTION WHEN FUNCTION IS PERFORMED BY USING SHORTCUT, AND IMAGE FORMING APPARATUS TO PERFORM THE METHOD

CROSS-REFERENCE TO RELATED APPLICATIONS

This application claims the benefit of Korean Patent Application No. 10-2012-0109263, filed on Sep. 28, 2012, in the Korean Intellectual Property Office, the disclosure of which is incorporated herein in its entirety by reference.

BACKGROUND OF THE INVENTION

1. Field of the Inventive Concept

The present inventive concept relates to a method of setting an option that is necessary when a function of an image forming apparatus is performed by selecting a shortcut, and an image forming apparatus to perform the same.

2. Description of the Related Art

A shortcut refers to an object such as an icon which is previously set so as for a user to select a specific item of a menu displayed on a user interface at a desired position on the user interface in an electronic device such as a computer, a mobile phone, or a multi-function printer.

In general, in order to select the specific item of the menu displayed on the user interface, the user selects any one of a plurality of upper-level menu items displayed on the user interface, and when a plurality of lower-level menu items included in the selected upper-level menu item are displayed on the user interface, selects a desired item from among the lower-level menu items. However, when the shortcut is set, the user may conveniently perform a desired function by selecting only once on the user interface the shortcut set to correspond to a lower-level menu item to be selected without selecting an upper-level menu item, and then selecting a desired lower-level menu item from among lower-level menu items included in the selected upper-level menu item. Also, since the shortcut is generally embodied as an icon on a main menu page or a wallpaper of the user interface, the user may conveniently and quickly access a corresponding item by previously setting a shortcut corresponding to an item which the user often visits.

Meanwhile, there are cases where an option needs to be set in order to perform a function of an item. For example, in order to transmit a file via email to people who belong to a specific group from among groups in an address list, the specific group to which the file is to be transmitted via email has to be selected first. Accordingly, when a shortcut corresponding to a function of transmitting the file via email to the people who belong to the specific group is set, the specific group to which the file is to be transmitted via email has to be selected and stored as information for the shortcut. When a shortcut is generally set, an option that is necessary to perform a function corresponding to the shortcut is also set and stored.

If an option necessary to perform a specific function is not set and only a shortcut is set to correspond to the specific function, even when the user selects the shortcut, the specific function may not be performed. If shortcuts for functions expected to be often used are preset when an image forming apparatus or the like is manufactured, user convenience may be improved. However, shortcuts for functions that require options to be set may not be preset when the image forming apparatus or the like is manufactured.

SUMMARY OF THE INVENTION

The present inventive concept provides a method of setting an option that is necessary to perform a function when the function is performed by selecting a shortcut in an image forming apparatus.

Additional features and utilities of the present general inventive concept will be set forth in part in the description which follows and, in part, will be obvious from the description, or may be learned by practice of the general inventive concept.

Exemplary embodiments of the present inventive concept provide an image forming apparatus including: a user interface unit to provide one or more shortcuts each set to correspond to a specific function of the image forming apparatus and to receive an input to select any one of the one or more shortcuts; a storage unit to store shortcut information about functions corresponding to the one or more shortcuts and options related to the functions; a job executing unit to perform a function corresponding the selected shortcut; and a control unit to control the job executing unit to perform the function corresponding to the selected shortcut by using the shortcut information stored in the storage unit, wherein when the shortcut is selected, the control unit controls the job executing unit to perform the function corresponding to the selected shortcut or controls the user interface unit to display an option setting page to set an option necessary to perform the function corresponding to the selected shortcut.

The control unit may include: an option setting determining unit to determine whether there exists a need to set an option item to perform the function corresponding to the selected shortcut, and when there exists the need to set the option item, determines whether the option is set; and a shortcut information managing unit to provide information necessary for determination of the option setting determining unit by viewing the shortcut information stored in the storage unit, and updates the shortcut information stored in the storage unit according to an option setting input received through the user interface unit, wherein when it is determined by the option setting determining unit that there exists the option item necessary to perform the function corresponding to the selected shortcut and the option is not set, the control unit controls the user interface unit to display the option setting page.

The control unit may further include a variable option determining unit to determine whether there exists the need to set the option item and the option is set when it is determined by the option setting determining unit that there exists the option item needing to be set and the option is set, and to determine whether there exists a setting change request for the variable option item when there exists the variable option item, wherein when it is determined by the variable option determining unit that there exists the setting change request for the variable option item, the control unit controls the user interface unit to display the option setting page.

The control unit may further include a variable option determining unit to determine whether a time taken for the shortcut to be touched is equal to or greater than a preset period of time when it is determined by the option setting determining unit that there exists the need to set the option item and the option is set, and to determine whether there exists a variable option item in the option items when the time is equal to or greater than the preset period of time, wherein when it is determined by the variable option determining unit that there exists the variable option item, the control unit controls the user interface unit to display the option setting page.

Exemplary embodiments of the present inventive concept also provide a method of setting an option when a function is performed by using a shortcut in an image forming apparatus, the method including: selecting any one of one or more shortcuts each set to correspond to a specific function of the image forming apparatus; performing a function corresponding to the selected shortcut or displaying an option setting page to set an option necessary to perform the function corresponding to the selected shortcut; and when an option setting input is received after the option setting page is displayed, performing the function corresponding to the selected shortcut according to the option.

The displaying of the option setting page may include: determining whether there exists a need to set an option item to perform the function corresponding to the selected shortcut, and when there exists a need to set the option item, determining whether the option is set; and when it is determined that there exists a need to set the option item and the option is not set, displaying the option setting page.

The displaying of the option setting page may include: determining whether there exists a need to set an option item to perform the function corresponding to the selected shortcut, and when there exists a need to set the option item, determining whether the option is set; when it is determined that there exists the need to set the option item and the option is set, determining whether there exists a variable option item in the option item; when there exists the variable option item, determining whether there exists a setting change request for the variable option item; and when there exists the setting change request, displaying the option setting page.

Exemplary embodiments of the present inventive concept also provide an image forming apparatus, comprising: a user interface unit to provide a shortcut region with a plurality of selectable shortcuts each to correspond with a function of the image forming apparatus; a job executing unit to execute a function corresponding to a selected shortcut; and a control unit to determine whether an option item is necessary to perform the function corresponding to a selected shortcut, and to control the user interface unit to display an option setting page to set an option necessary to perform the function when it is determined that an option item is necessary to perform the function, otherwise controlling the job executing unit to perform the function corresponding to a selected shortcut.

In an exemplary embodiment, image forming apparatus further includes a storage unit to store shortcut information about functions corresponding to plurality of selectable shortcuts and options related to the functions.

In an exemplary embodiment, the control unit comprises: an option setting determining unit to determine whether it is necessary to set an option item; and a variable option setting unit to determine whether there exists a variable option item in the option item when it is determined that it is necessary to set an option item, and when it is determined that there exists a variable option item, to determine where there exists a setting change request for the variable option item.

In an exemplary embodiment, the setting change request is made by adjusting a time taken for a user to touch a shortcut.

In an exemplary embodiment, when it is determined that there exists a variable option item and there exits a setting change request, the control unit controls the user interface unit to display an option setting page, and when an option setting input is received through the user interface unit from the user, the control unit changes a setting op the option according to the option setting input, and controls the job executing unit to perform a function corresponding to the selected shortcut.

In an exemplary embodiment, the control unit comprises: an option setting determining unit to determine whether it is necessary to set an option item; and a variable option setting unit to determine whether there exists a setting change request input by a user when it is determined that it is necessary to set an option item, and if there exists a setting change request, then to determine whether there exists a variable option item to be set.

BRIEF DESCRIPTION OF THE DRAWINGS

The above and other features and utilities of the present inventive concept will become more apparent by describing in detail exemplary embodiments thereof with reference to the attached drawings in which.

DETAILED DESCRIPTION OF THE PREFERRED EMBODIMENTS

Figure 1:
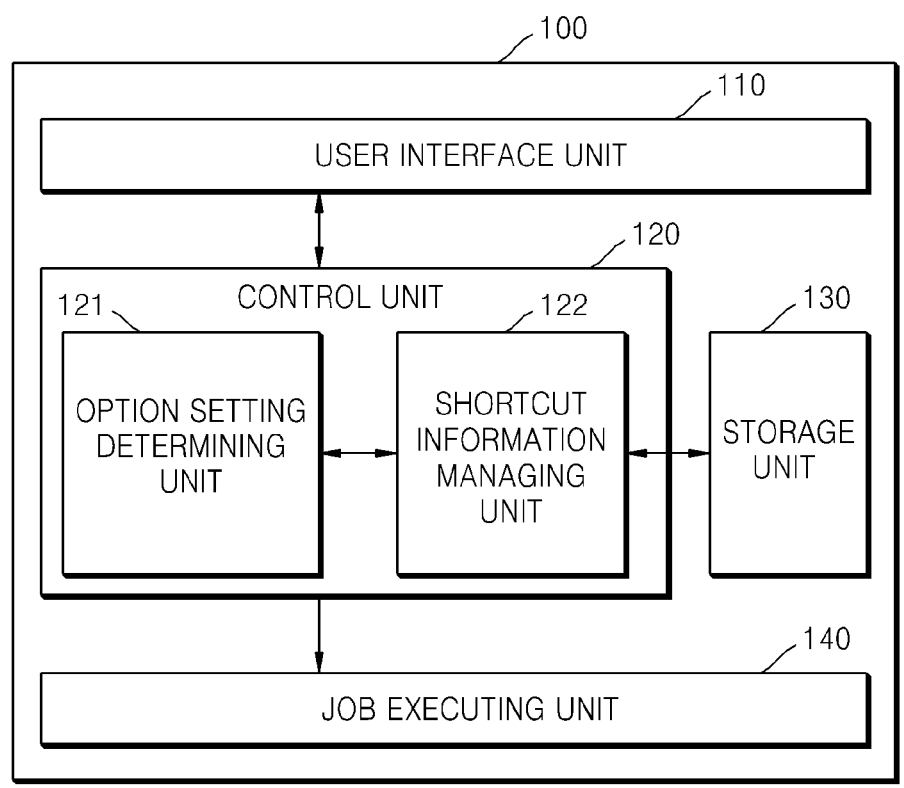
FIG. 1 is a block diagram illustrating an image forming apparatus according to an embodiment of the present inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

A method of performing a function of an image forming apparatus by using a shortcut and setting the shortcut will be first explained with reference to FIGS. 2A through 5E before describing an operation of the image forming apparatus in detail. Functions of the image forming apparatus may be classified into a window movement function and a job execution function. The window movement function refers to a function of displaying a specific window on a user interface so that a user may see the specific window. The job execution function refers to a function of executing a specific image forming job. An "Auto Fit Copy" function will be explained as an example of the window movement function and a "Ground Send" function will be explained as an example of the job execution function.

In order for the image forming apparatus to perform a specific function, a menu page displayed on the user interface of the image forming apparatus has to be manipulated several times. However, when a shortcut is set to correspond to the specific function of the image forming apparatus, the specific function may be conveniently performed by selecting the shortcut on the user interface only once. In this case, the shortcut may be an icon displayed on a touch screen or a button that is included as hardware in the image forming apparatus. Alternatively, the shortcut may be any type of object that may receive the user's selection input on the user interface.

Figure 2A:
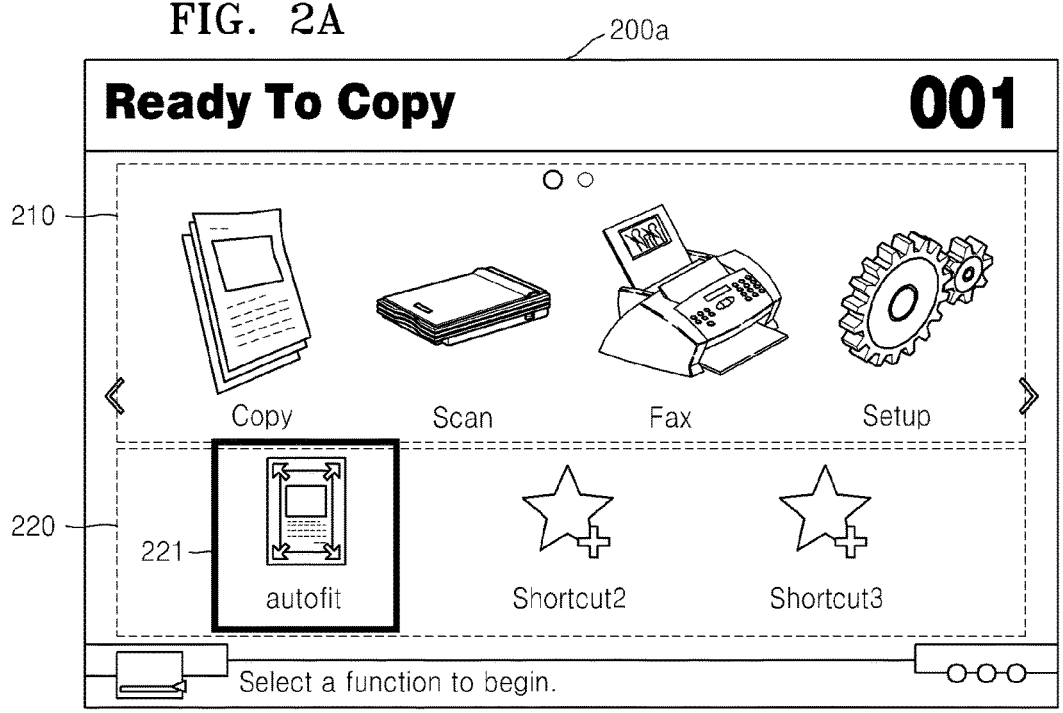
FIGS. 2A and 2B are pages displayed on a user interface unit when a function of the image forming apparatus is performed by using a shortcut, according to an embodiment of the present inventive concept.
Figure 2B:
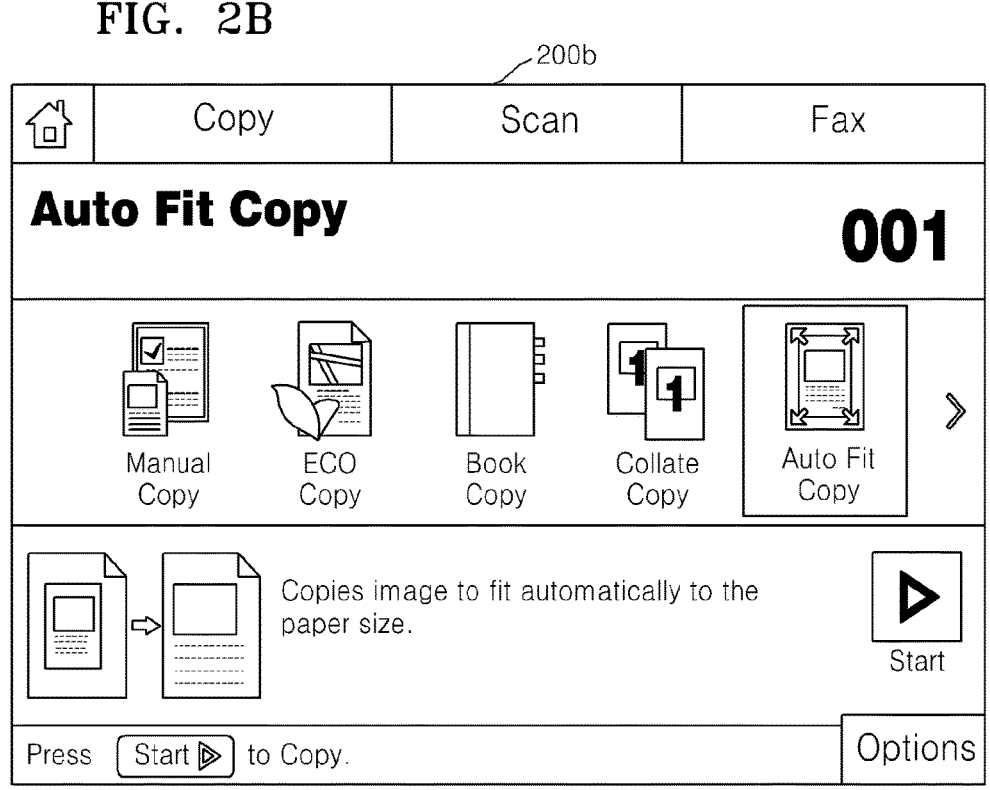

A case where the "Auto Fit Copy" function is performed by using a shortcut will be explained with reference to FIGS. 2A and 2B. A wallpaper 200a of FIG. 2A is an image basically displayed on the user interface. The wallpaper 200a includes a main menu region 210 and a shortcut region 220. Main menu items which categorically classify functions of the image forming apparatus are displayed on the main menu region 210. Four main menu items "Copy", "Scan", "Fax", and "Setup" are displayed on the main menu region 210 of FIG. 2A.

In order to perform a specific function of the image forming apparatus, a process of selecting any one of the main menu items displayed on the main menu region 210 and selecting any one of lower-level menu items included in the selected main menu item would be repeated. In order to perform, for example, the "Auto Fit Copy" function, "Copy" is selected from among the main menu items displayed on the main menu region 210. An image including lower-level menu items included in the main menu item "Copy" is displayed. A user may enable the image forming apparatus to perform the "Auto Fit Copy" function by selecting "Auto Fit Copy" from among the displayed lower-level menu items.

Meanwhile, shortcut items are displayed on the shortcut region 220 of the wallpaper 200a. "autofit" 221, which is a shortcut corresponding to the "Auto Fit Copy" function, is displayed on the shortcut region 220 of FIG. 2A. When a shortcut is set, a name of the shortcut may be freely set by the user, which will be explained with reference to FIGS. 4A through 5E. When the shortcut "autofit" 221 is selected, a function performing page 220b of FIG. 2B is directly accessed. That is, when a shortcut is set, a desired function may be performed with only one selection without performing several selections. In the case of a window movement function such as the "Auto Fit Copy" function, an option item needing to be set to perform the function does not exist.

Figure 3A:
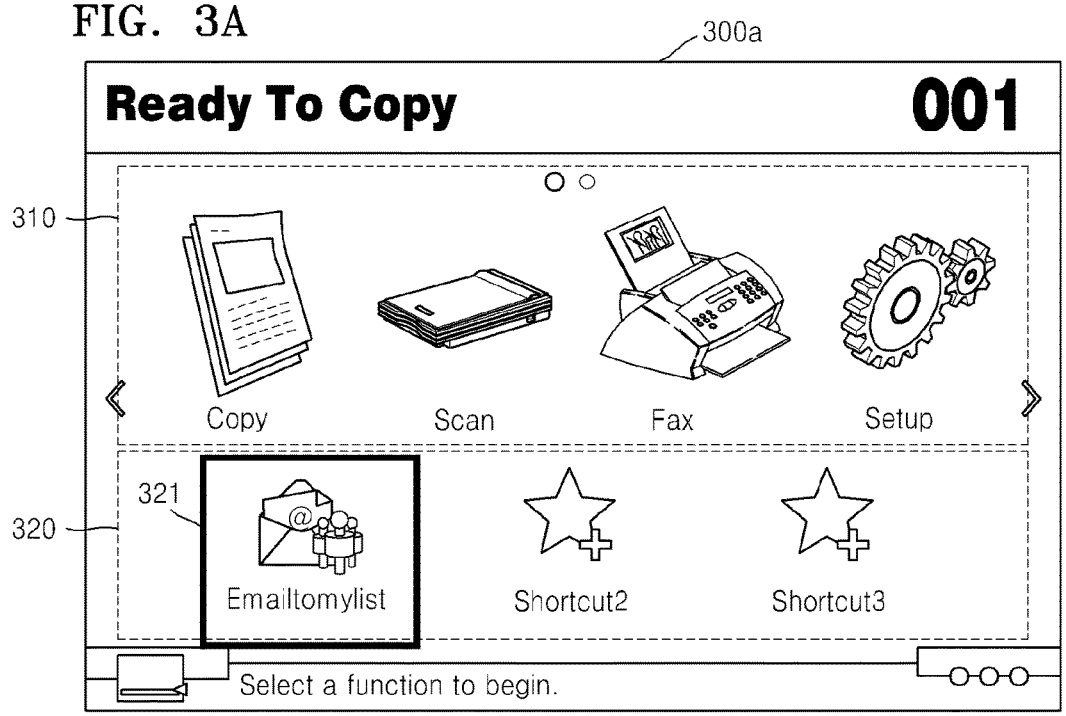
FIGS. 3A and 3B are pages displayed on the user interface unit when a function of the image forming apparatus is performed by using a shortcut, according to another embodiment of the present inventive concept.
Figure 3B:
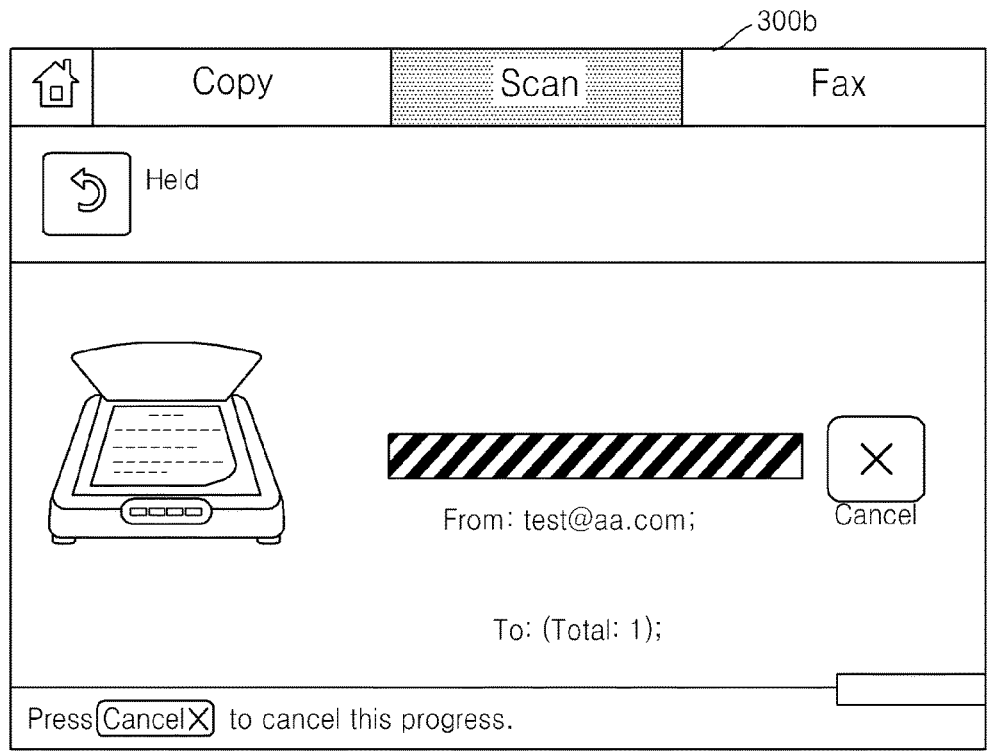
Figure 4A:
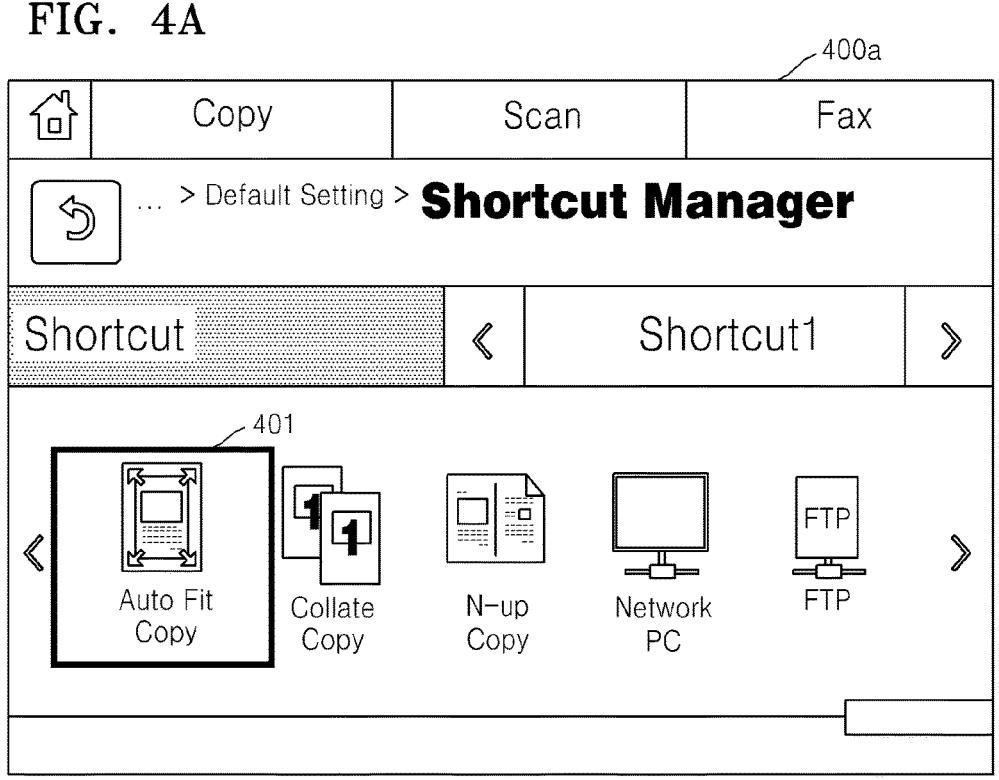
FIGS. 4A through 4D are pages displayed on the user interface unit when a shortcut is set, according to another embodiment of the present inventive concept.
Figure 4B:
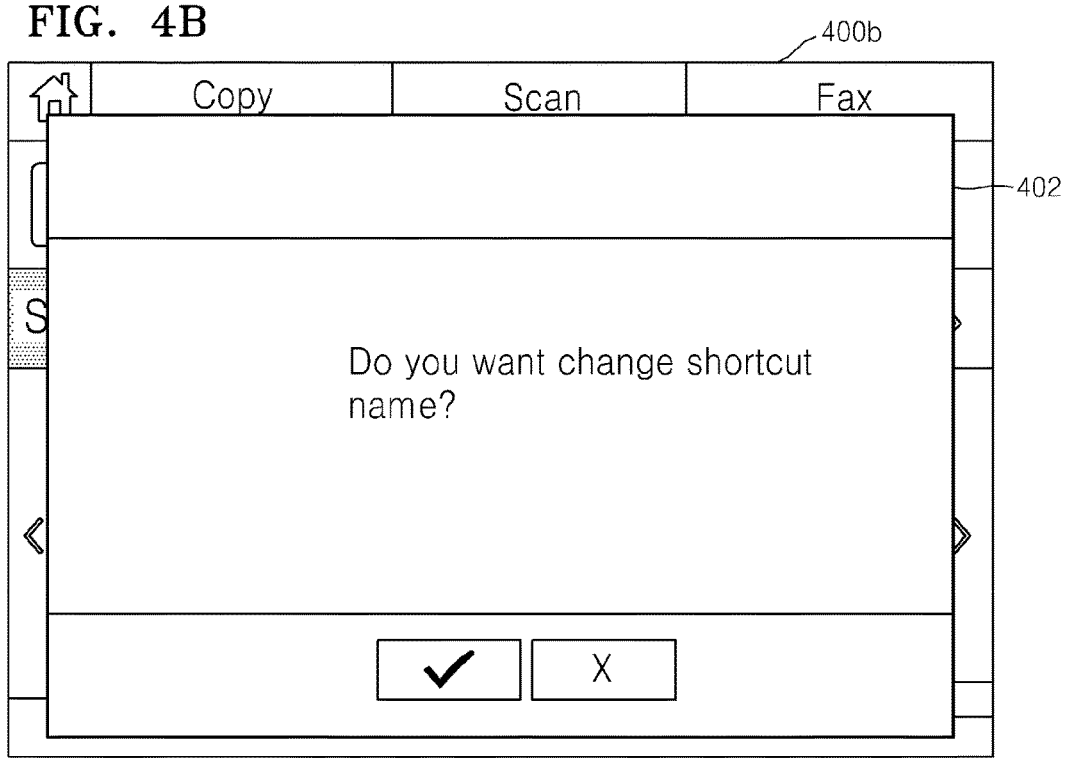
Figure 4C:
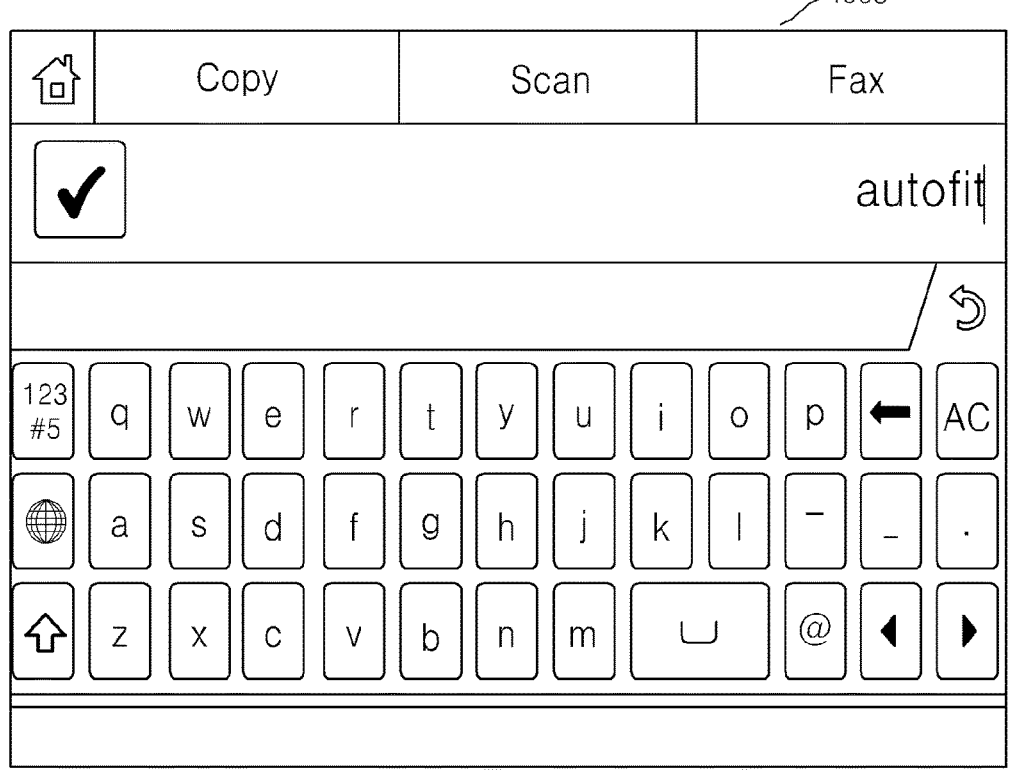
Figure 4D:
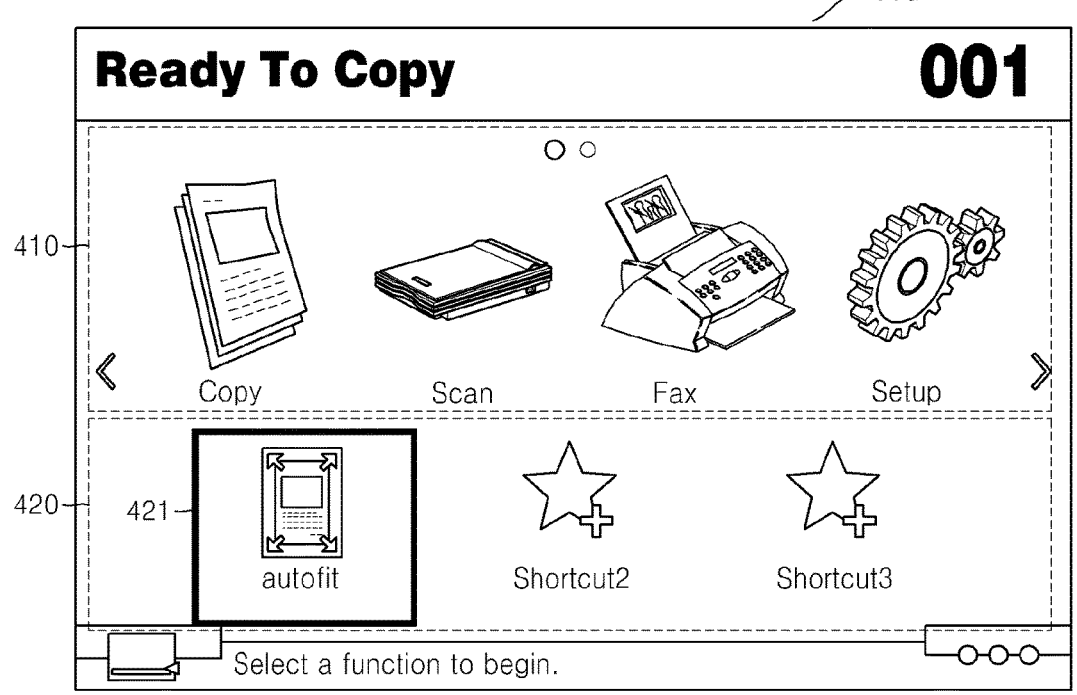

A case where the "Group Send" function is performed by using a shortcut will be explained with reference to FIGS. 3A and 3B. A wallpaper 300a and a main menu region 310 and a shortcut region 320 included in the wallpaper 300a of FIG. 3A are respectively the same as the wallpaper 200a and the main menu region 210 and the shortcut region 220 of FIG. 2A, and thus a detailed explanation thereof will not be given.

A method of performing the "Group Send" function without a shortcut will be explained. "Scan" is selected from among the main menu items displayed on the main menu region 310. Once the main menu "Scan" is selected, lower-level menu items for determining where a scan file is to be transmitted are displayed on a screen. When the "Group Send" function, which is a function of transmitting to an email address of a specific group included in an address list, is selected from among the lower-level menu items, a page to select a destination group is displayed. When the user selects any one destination group, the scan file is transmitted to an email address of the selected destination group. In order to perform the "Group Send" function, a destination group has to be set. As such, in the case of the job execution function, there is a need to set an option item to perform the job execution function.

A method of performing the "Ground Send" function by using a shortcut will be explained. When "Emailtomylist" 321, which is a shortcut set to correspond to the "Group Send" function, is selected from among shortcut items displayed on the shortcut region 320, a function performing page 300b of FIG. 3B is displayed, and a job of transmitting a scan file via email to a specific group in an address list is directly performed. In this case, in order to perform a job by selecting a shortcut, a destination group corresponding to the shortcut, that is, "Emailtomylist" 321, has to be set. If the shortcut "Emailtomylist" 321 is selected when the destination group corresponding to the shortcut "Emailtomylist" 321 is not set, since it is not known to where the scan file is to be transmitted, a function corresponding to the shortcut "Emailtomylist" 321 may not be performed.

Accordingly, when there exists an option item needing to be set to perform a function, an option has to be set when a shortcut is set. The option is stored as shortcut information along with the function corresponding to the shortcut. A case where the option needs to be set and does not need to be set when the shortcut is set will be briefly explained below.

Since there does not exist an option item needing to be set to perform the "Auto Fit Copy" function, an option does not need to be set when a shortcut corresponding to the "Auto Fit Copy" function is set. Referring to FIGS. 4A through 4D, when "Auto Fit Copy" 401, which is a function item to set a shortcut is selected on a shortcut setting page 400a of FIG. 4A, a dialog window 402 asking whether a shortcut name is to be changed is displayed on a page 400b of FIG. 4B. Assuming that the shortcut name is to be changed, when a desired shortcut name is input through a touch keyboard displayed on a page 400c of FIG. 4C, "autofit" 421, which is a shortcut having the desired shortcut name, is displayed on a shortcut region 420 of a main page 400d.

Figure 5A:
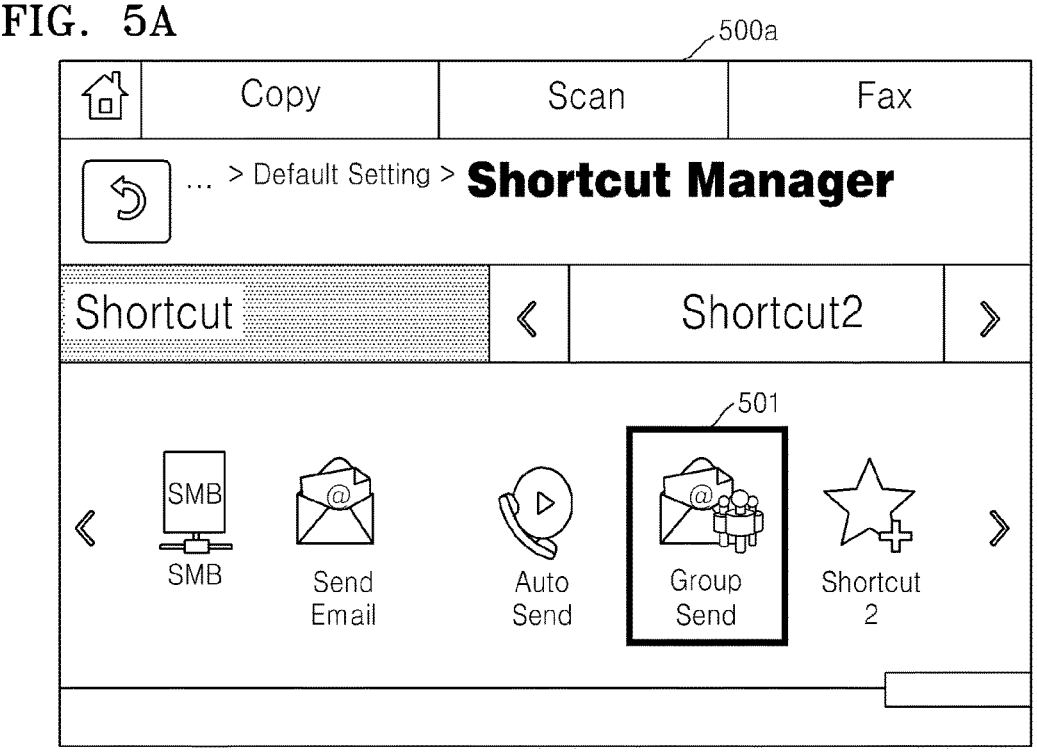
FIGS. 5A through 5E are pages displayed on the user interface unit when a shortcut is set, according to another embodiment of the present inventive concept.
Figure 5B:
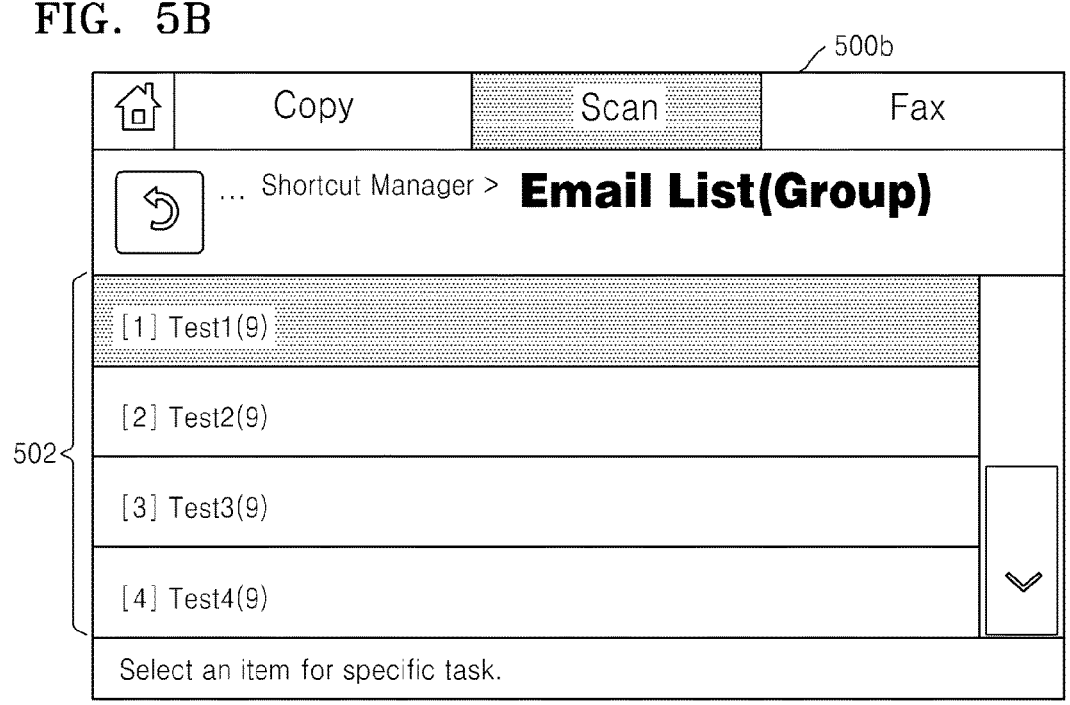
Figure 5C:
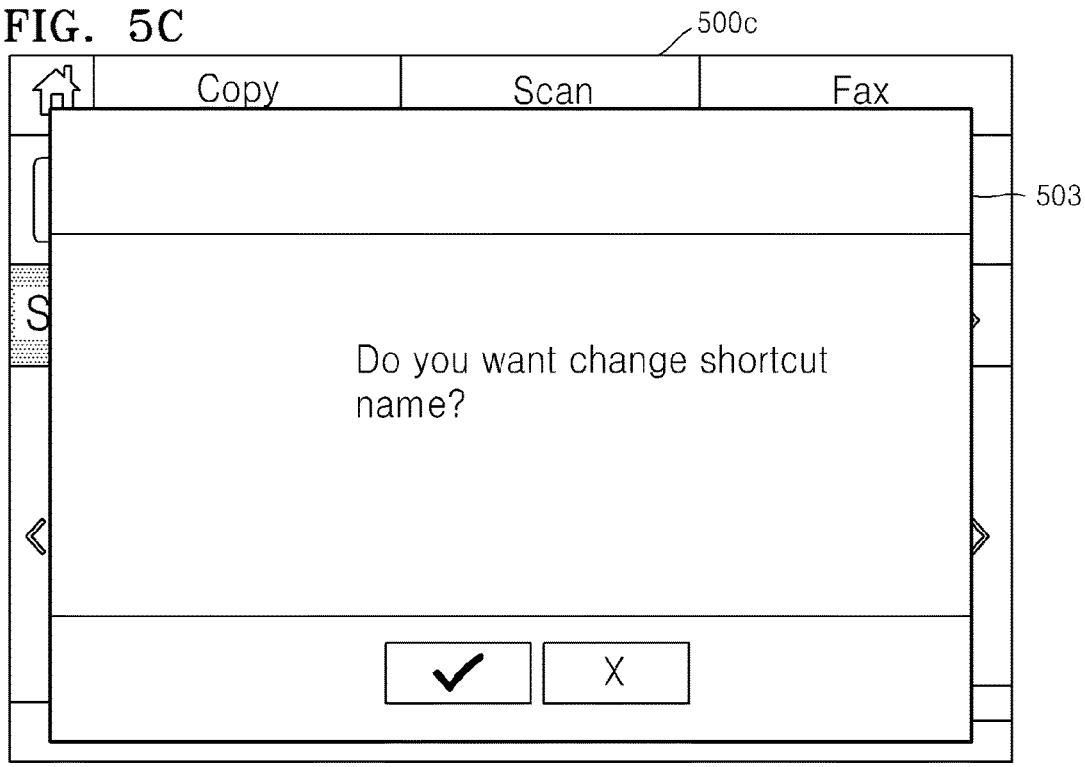
Figure 5D:
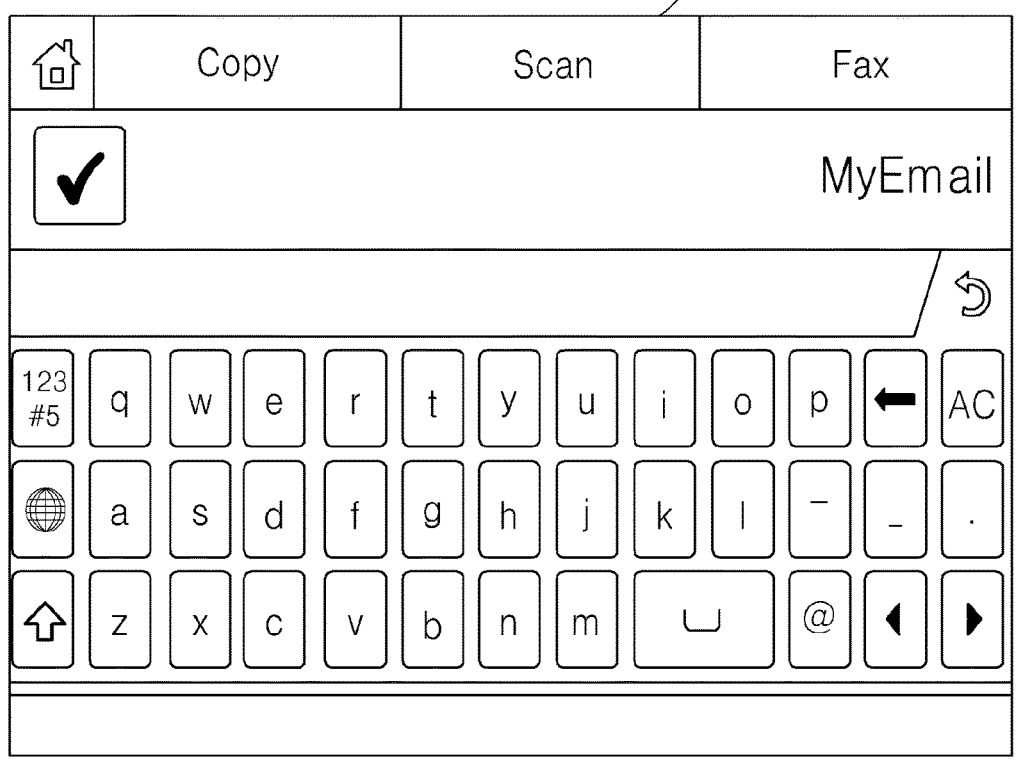
Figure 5E:
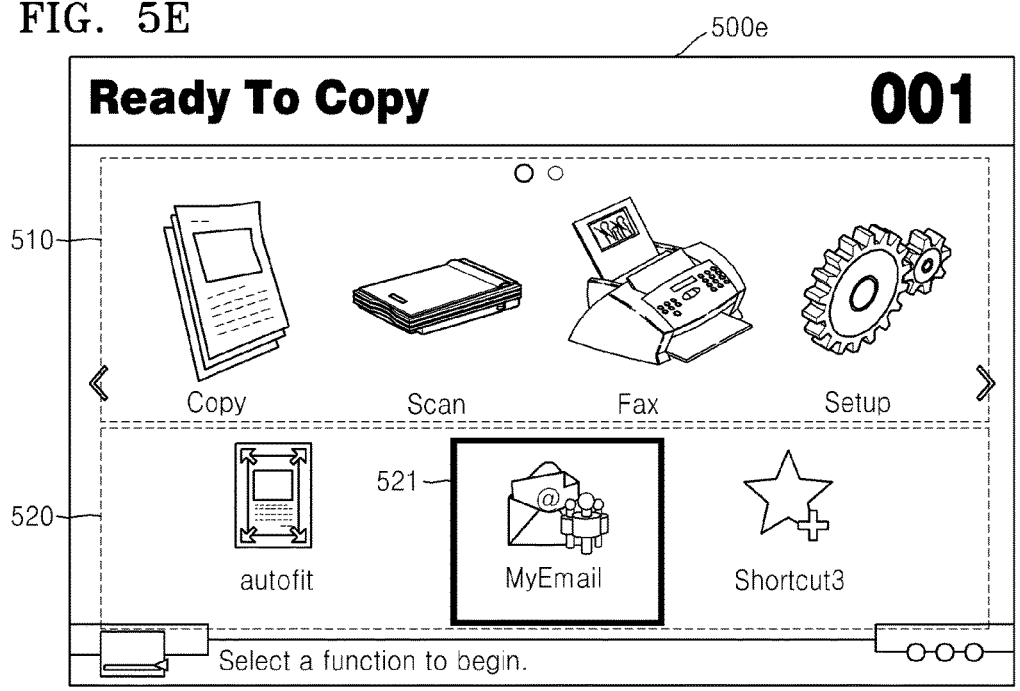

On the contrary, since there exists a need to set an option item to perform the "Group Send" function, an option has to be set when a shortcut corresponding to the "Ground Send" function is set. Referring to FIGS. 5A through 5E, when the "Group Send" function, which is a function item to set a shortcut, is selected on a shortcut setting page 500a of FIG. 5A, an option setting page such as a page 500b of FIG. 5B is displayed. A list 502 to select a destination group is displayed, and when any one of items of the list 502 is selected, a dialog window 503 asking whether a shortcut name is to be changed is displayed on a page 500c of FIG. 5C. Assuming that the shortcut name is to be changed, when a desired shortcut name is input through a touch keyboard displayed on a page 500d, "MyEmail" 521, which is a shortcut having the desired shortcut name, is displayed on a shortcut region 520 of a main page 500e.

When a shortcut corresponding to a function that requires an option to be set is set, the option has to be set and stored as information for the shortcut as described above. Otherwise, since a necessary option is not set even when a shortcut is selected, a corresponding function may not be performed. Accordingly, the following problems may occur.

When an option for performing a function corresponding to a shortcut is not set, since the function may be performed by using the shortcut only after the option is set, it may be difficult for a user who does not know how to set the option to use the shortcut.

When shortcuts are preset for functions of the image forming apparatus which are expected to be used often when the image forming apparatus is manufactured, user convenience may be improved. However, in the case of a function that requires an option to be set, since a setting desired by the user may not be predicted in advance, a shortcut may not be set.

The problems may be solved by using the image forming apparatus of the present embodiment.

FIG. 1 is a block diagram illustrating an image forming apparatus according to an embodiment of the present inventive concept. Referring to FIG. 1, the image forming apparatus may include a user interface unit 110, a control unit 120, a storage unit 130, and a job executing unit 140. In this case, the control unit 120 may include an option setting determining unit 121 and a shortcut information managing unit 122.

The user interface unit 110 provides a menu to operate the image forming apparatus to the user, and receives an input from the user and transmits the input to the control unit 120. The user interface unit 110 may include a touch-type display unit, and may provide a menu as an icon displayed on the touch-type display unit to the user and may receive an input when the user touches the icon. In particular, the user interface unit 110 may display shortcuts on a wallpaper which is basically displayed, and may display a page to set a shortcut or an option setting page as desired.

When the user selects any one of the shortcuts displayed on the user interface unit 110, the control unit 120 receives information indicating that the corresponding shortcut is selected from the user interface unit 110. The control unit 120, which may include the option setting determining unit 121 and the shortcut information managing unit 122, determines whether there exists a need to set an option item to perform a function corresponding to the selected shortcut, and when it is determined that there exists a need to set the option item, determines whether an option is set.

When it is determined that there does not exist a need to set the option item, or there exists a need to set the option item and the option is set, the control unit 120 controls the user interface unit 110 or the job executing unit 140 to perform the function corresponding to the selected shortcut. Referring to FIGS. 2A through 3B, when the selected shortcut is, for example, the shortcut "autofit" 221 of FIG. 2A, the option setting determining unit 121 determines that there does not exist a need to set the option item and the control unit 120 controls the user interface unit 110 to display the page 200b of FIG. 2B and perform the corresponding function.

Alternatively, when the selected shortcut is the shortcut "Emailtomylist" 321 of FIG. 3A, since a destination group has to be set to perform the function corresponding to the shortcut, the option setting determining unit 121 determines that there exists a need to set the option item. Also, the option setting determining unit 121 determines whether the option is set, that is, whether the destination group is set. When it is determined that the destination group is set, the control unit 120 controls the job executing unit 140 to transmit a file via email to the destination group.

In this case, the option setting determining unit 121 receives shortcut information from the shortcut information managing unit 122 to determine whether there exists a need to set the option item to perform the function corresponding to the shortcut and whether the option is set. The shortcut information managing unit 122 manages the shortcut information including information about the function corresponding to the shortcut and the option necessary to perform the function corresponding to the shortcut. For example, when the shortcut "MyEmail" 521 is set through a process of FIGS. 5A through 5E, the shortcut information indicating that a function corresponding to the shortcut is "Group Send" and a destination group which is an option item necessary to perform the corresponding function is set to "Test1 (9)" is stored by the shortcut information managing unit 122 in the storage unit 130.

When the shortcut "MyEmail" 521 is selected on the user interface unit 110, the shortcut information managing unit 122 views the shortcut information stored in the storage unit 130 and transmits to the option setting determining unit 121 information indicating that a function corresponding to the shortcut "MyEmail" 521 is "Group Send" and a destination group which is an option item necessary to perform the function "Group Send" is set to "Test1 (9)". The option setting determining unit 121 may determine that there exists the option item necessary to perform the function based on the fact that the function corresponding to the shortcut "MyEmail" 521 is "Group Send" and may determine that the option is set based on the fact that the destination group is set to "Test1 (9)".

On the contrary, when it is determined by the option setting determining unit 121 that there exists a need to set the option item to perform the function corresponding to the shortcut but the option is not set, the control unit 120 controls the user interface unit 110 to display an option setting page, and when an option setting input is received through the user interface unit 110, the control unit 120 controls the job executing unit 140 to perform the function corresponding to the shortcut. In this case, the shortcut information managing unit 122 of the control unit 120 updates the shortcut information stored in the storage unit 130 according to the option setting input.

Figure 6A:
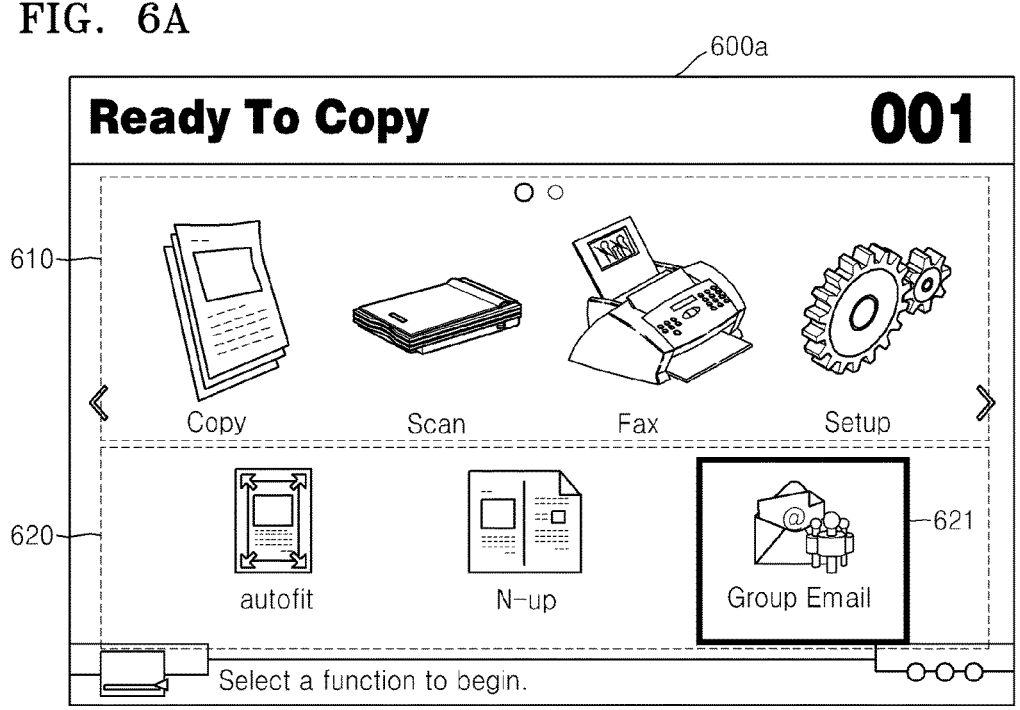
FIGS. 6A through 6C are pages displayed on the user interface unit when a function of the image forming apparatus is performed by using a shortcut and an option is set, according to another embodiment of the present inventive concept.
Figure 6B:
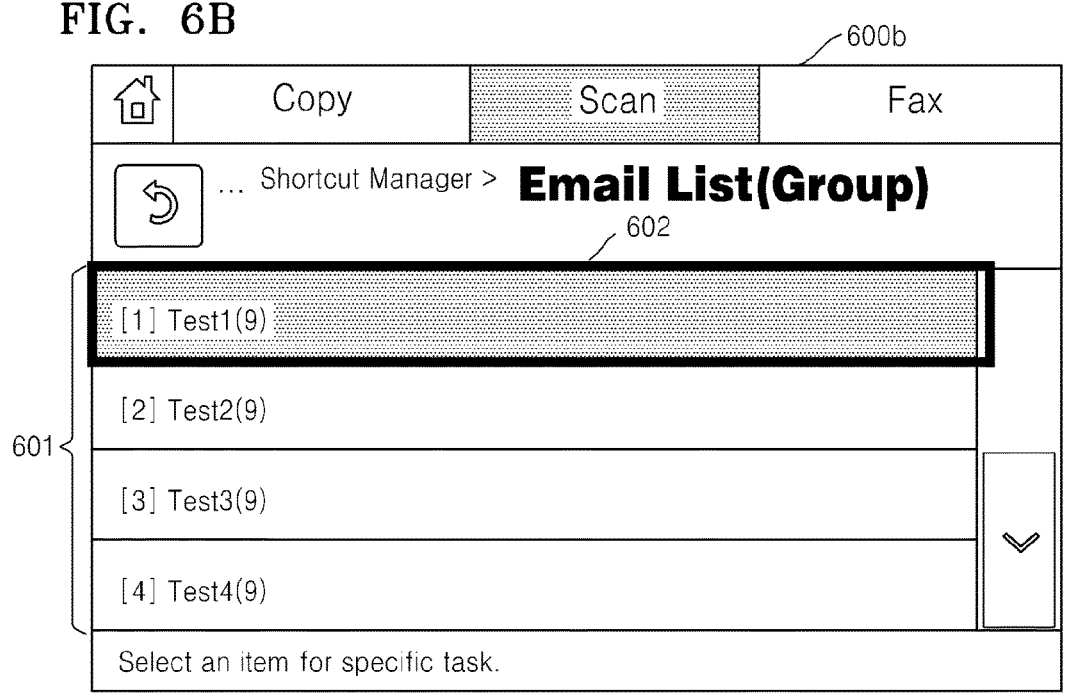
Figure 6C:
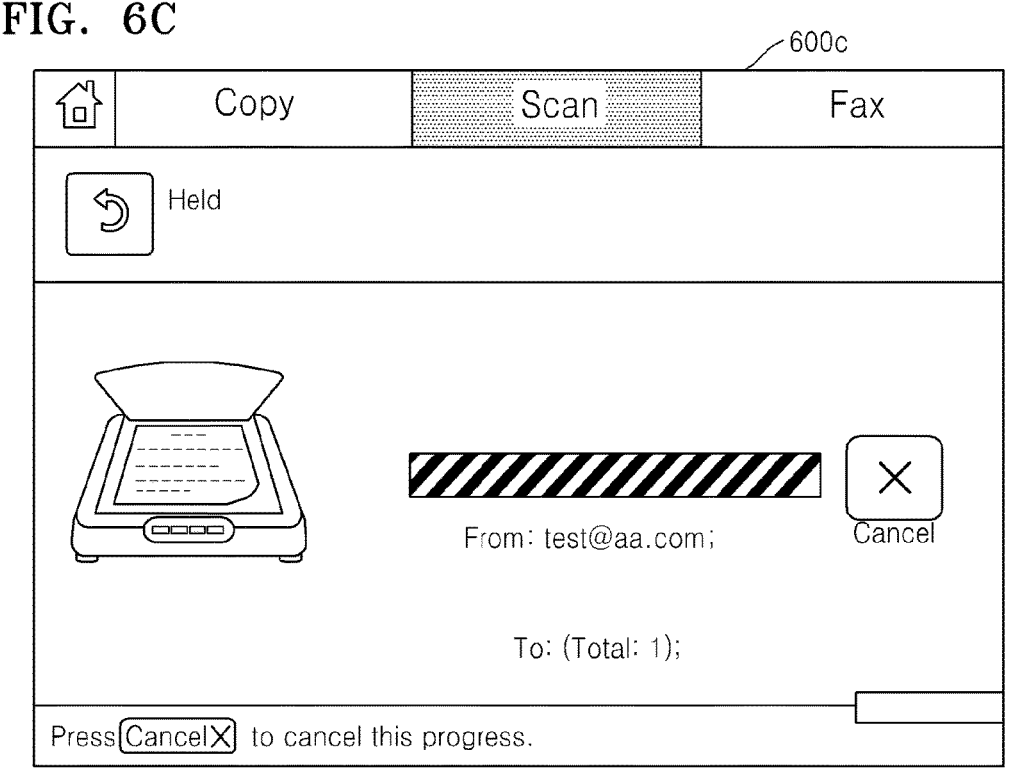

A process of setting an option when a function is performed by using a shortcut will be explained in detail with reference to FIGS. 1, and 6A through 6C. A wallpaper 600a of FIG. 6A includes a main menu region 610 and a shortcut region 620. When "Group Email" 621 is selected by a user from among shortcut items on the shortcut region 620, since a destination group has to be set in order to perform "Group Send" which is a function corresponding to the shortcut "Group Email" 621 based on shortcut information provided from the shortcut information managing unit 122, the option setting determining unit 121 determines that there exists a need to set an option item. The option setting determining unit 121 determines whether a destination group, which is an option item, is set, and when it is determined that the destination group (option item) is not set, the option setting determining unit 121 controls the user interface unit 110 to display an option setting page 600b of FIG. 6B. An option list 601 is displayed on the option setting page 600b. When the control unit 120 receives a selection input for any one of items of the option list 601 from the user, the control unit 120 controls the job executing unit 140 to perform the "Group Send" function according to the option, and a function performing page 600c of FIG. 6C is displayed on the user interface unit 110.

That is, even when, for a function that requires an option item to be set, a shortcut is set but an option is not set, the user may perform a function by setting the option on an option setting page displayed subsequently when the user selects the shortcut. Accordingly, even when the user does not know a complex method of setting an option, the user may conveniently set the option when selecting a shortcut. Also, although an image forming apparatus manufacturer does not know an option setting value to be used by the user in advance, since a shortcut is preset for a function which is expected to be often used when the image forming apparatus is manufactured, user convenience may be improved.

An operation of an image forming apparatus according to another embodiment of the present invention will be explained with reference to FIGS. 7 through 9D. The image forming apparatus of FIG. 7 further includes a variable option function when compared to the image forming apparatus of FIG. 1. The variable option function refers to a function in which a specific option item is designated as a variable option item when a shortcut is set and later a setting of an option designated as the variable option item may be changed when a function is performed by selecting the shortcut. In detail, when a variable option item is designated, when there exists a setting change request for the variable option item, an option setting page is displayed to a user and an option setting input is received from the user.

Figure 7:
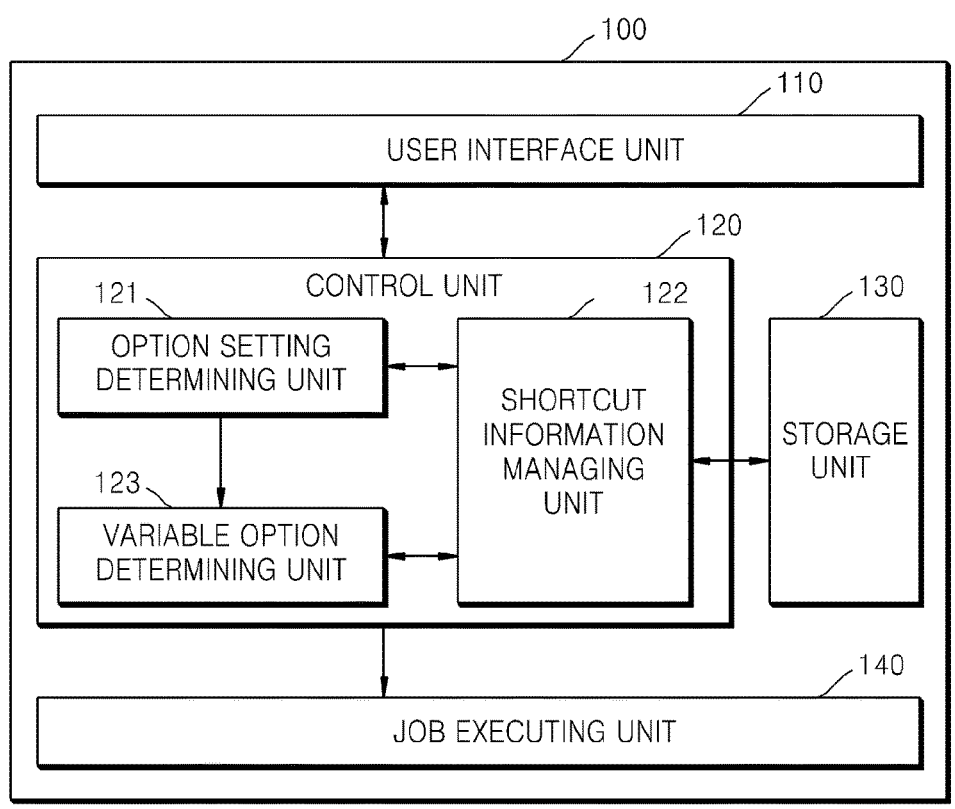
FIG. 7 is a block diagram illustrating an image forming apparatus according to another embodiment of the present inventive concept.

Elements of the image forming apparatus of FIG. 7 are the same as those of the image forming apparatus of FIG. 1 except that the image forming apparatus of FIG. 7 further includes a variable option determining unit 123. Operations of the other elements are the same as those of the image forming apparatus of FIG. 1, and thus only an operation of the variable option determining unit 123 will be explained in detail.

When it is determined by the option setting determining unit 121 that there exists a need to set an option item and an option is set, the variable option determining unit 123 determines whether there exists a variable option item in the option item, and when there exists the variable option item, determines whether there exists a setting change request for the variable option item. The setting change request for the variable option item may be made in various ways. For example, the setting change request may be made by adjusting a time taken for the user to touch a shortcut. For example, when the time taken for the user to touch the shortcut is equal to or greater than a preset period of time, it may be determined that there exists the setting change request. On the contrary, when the time taken for the user to touch the shortcut is less than the preset period of time, it may be determined that there does not exist the setting change request. Alternatively, the variable option determining unit 123 may first determine whether there exists the setting change request and then when there exists the setting change request, may determine whether there exists the variable option item.

When it is determined by the variable option determining unit 123 that there exists the variable option item and there exists the setting change request, the control unit 120 controls the user interface unit 110 to display an option setting page. Next, when an option setting input is received through the user interface unit 110 from the user, the control unit 120 changes a setting of the option according to the option setting input, and controls the job executing unit 140 to perform a function corresponding to the selected shortcut, which will be explained below in detail.

Figure 8A:
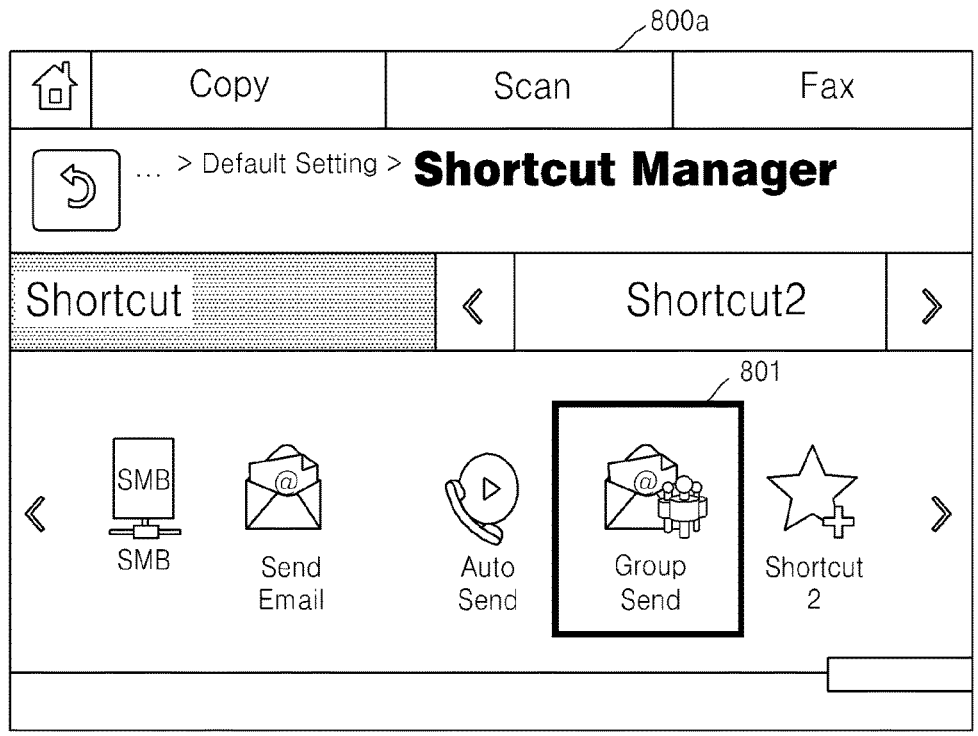
FIGS. 8A and 8B are pages displayed on the user interface unit in the case that a variable option item is designated when a shortcut is set in the image forming apparatus, according to an embodiment of the present inventive concept.
Figure 8B:
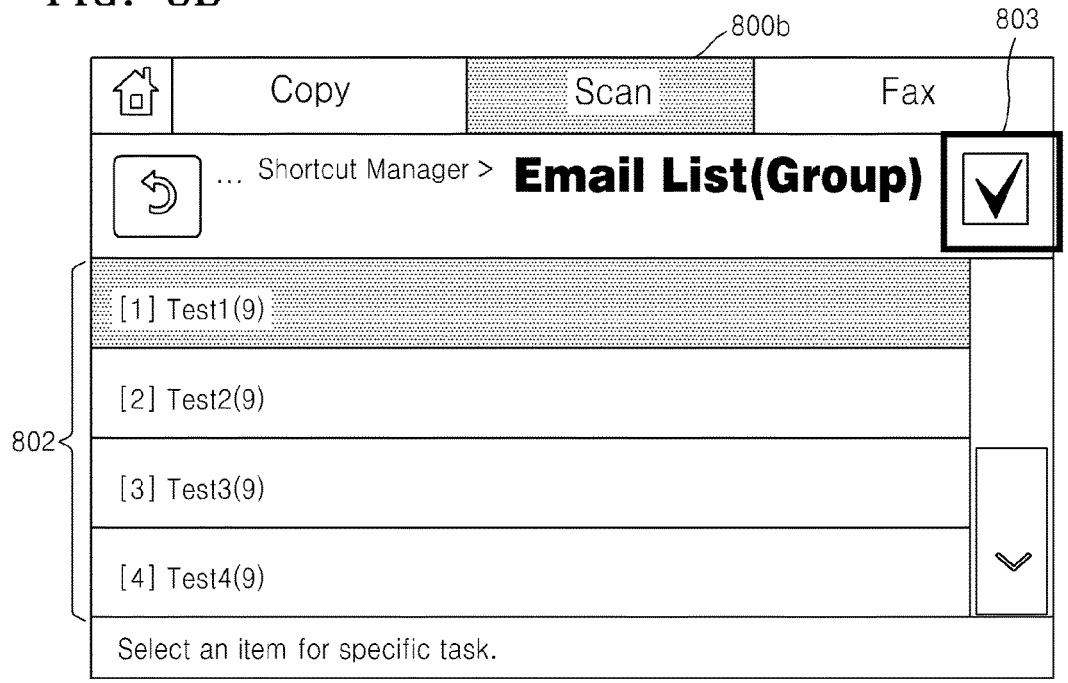

A method of setting a variable option item will be first explained. FIGS. 8A through 8B are pages displayed on the user interface in the case that the variable option item is designated when a shortcut is set in the image forming apparatus, according to an embodiment of the present invention. When an item "Group Send" 801 is selected by the user on a shortcut setting page 800a of FIG. 8A, a shortcut corresponding to the item "Group Send" 801 starts to be set and an option setting page 800b of FIG. 8B is displayed. The user may set an option by selecting any one of items of an option list 802 displayed on the option setting page 800b. In this case, there exists a check box 803 for designating the variable option item in the option setting page 800b. When the check box 803 is checked, a corresponding option item is designated as the variable option item. That is, although "Test1(9)" is set as an option in the option list 802 in FIG. 8B, when a shortcut is selected and there exists a setting change request, the option "Test1(9)" may be changed.

Figure 9A:
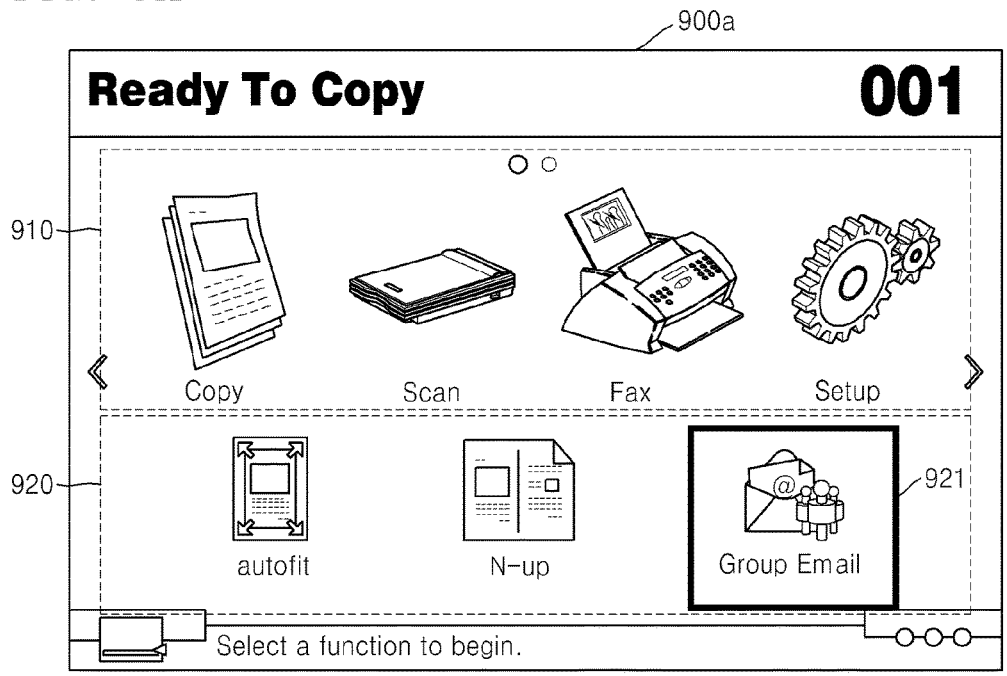
FIGS. 9A through 9D are pages displayed on the user interface unit in the case that a setting of the variable option item is changed when the shortcut is selected in the image forming apparatus, according to an embodiment of the present inventive concept.
Figure 9B:
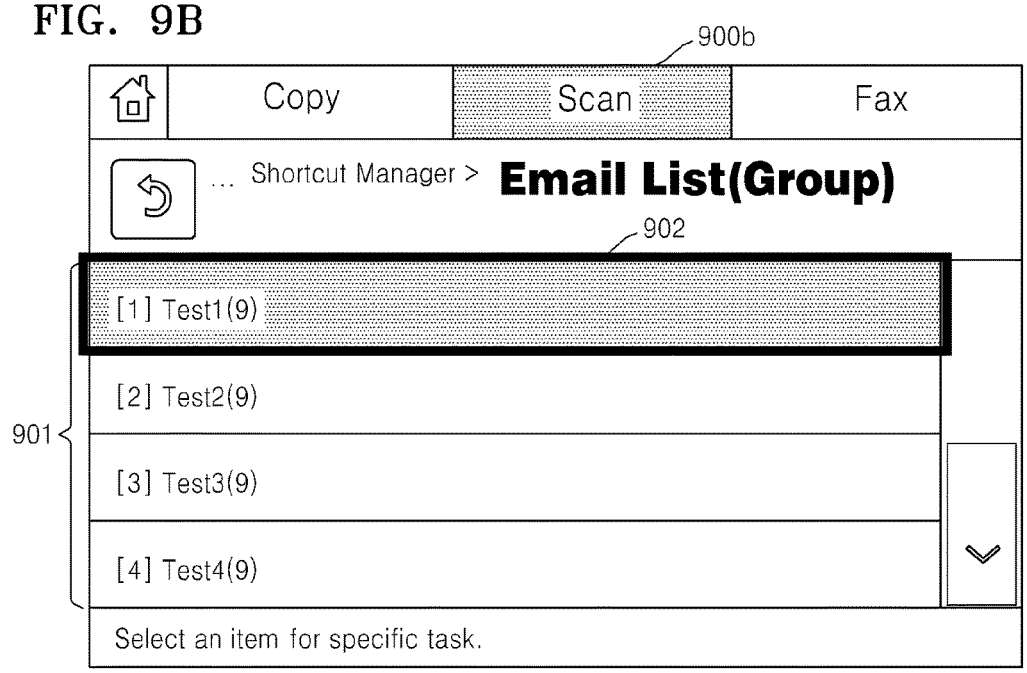
Figure 9C:
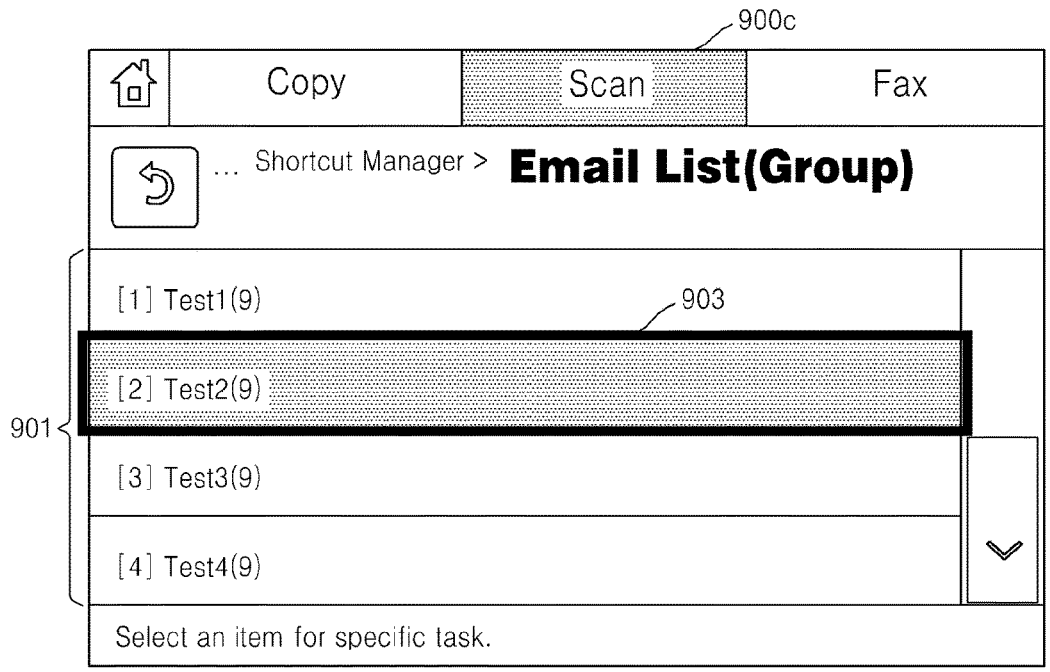
Figure 9D:
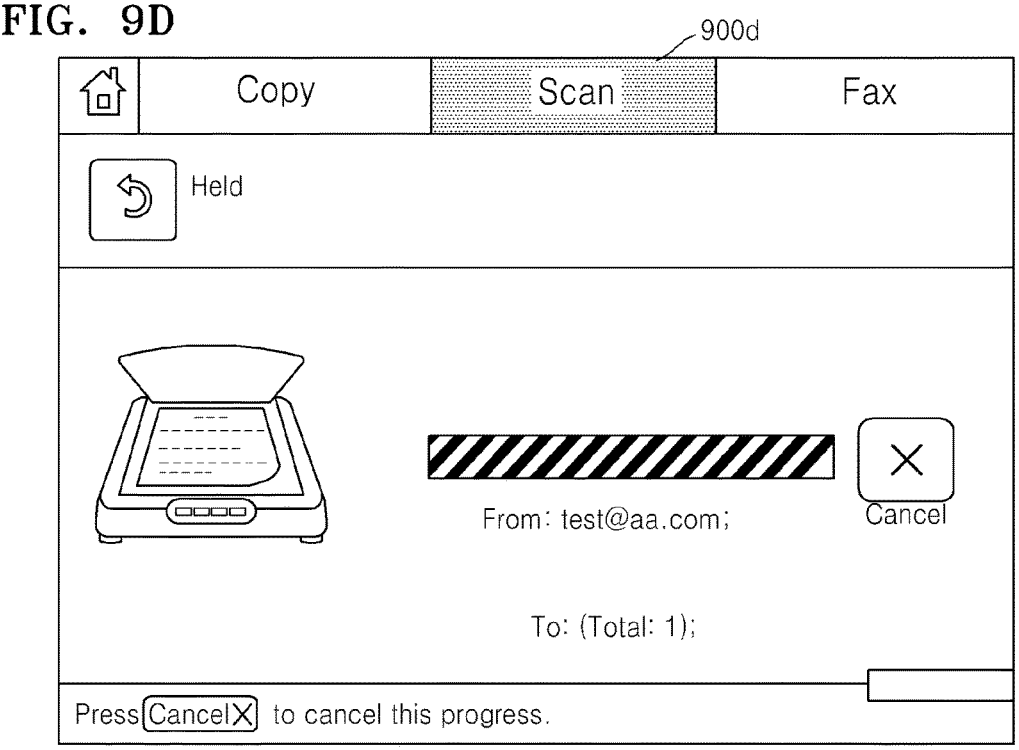

FIGS. 9A through 9D are pages displayed on the user interface when a setting of a variable option item is changed when a shortcut is selected in the image forming apparatus, according to an embodiment of the present invention. A selection input for "Group Email" 921 from among shortcut items displayed on a shortcut region 920 of a wallpaper 900a of FIG. 9A is received. When a shortcut is set, an option for a destination group is set to "Test1 (9)" 902. Assuming that the option "Test1 (9)" 902 is designated as a variable option item, when a time taken for the user to touch an icon of the item "Group Email" 921 is measured to be less than a preset period of time, a function corresponding to the item "Group Email" 921 is performed and when the time is equal to or greater than the preset period of time, an option setting page 900b of FIG. 9B is displayed. The option "Test1 (9)" 902 may be displayed on the option setting page 900b, and a new option setting input may be received from the user. A page 900c of FIG. 9C is a page when "test2(9)" is selected as an option by the user in the option list 901. When the option "test2(9)" is selected in the option list 901 of FIG. 9C, a function of transmitting a scan file via email to the option "test2(9)" is performed and a function performing page 900d of FIG. 9D is displayed. After the function is performed according to the option after the setting change, that is, "test2(9)", the option before the setting change, that is, "Test1 (9)", may be stored in the shortcut information or may be updated to the option after the setting change, that is, "test2(9)".

Since an option item to perform a function corresponding to a shortcut is designated as a variable option item and the variable option item may be changed whenever a function is performed by selecting a shortcut, a plurality of users may share the same shortcut and a user interface may be prevented from being complicated when a plurality of similar shortcuts are registered.

A method of setting an option when a function is performed by using a shortcut according to an embodiment of the present inventive concept will be explained.

Figure 10:
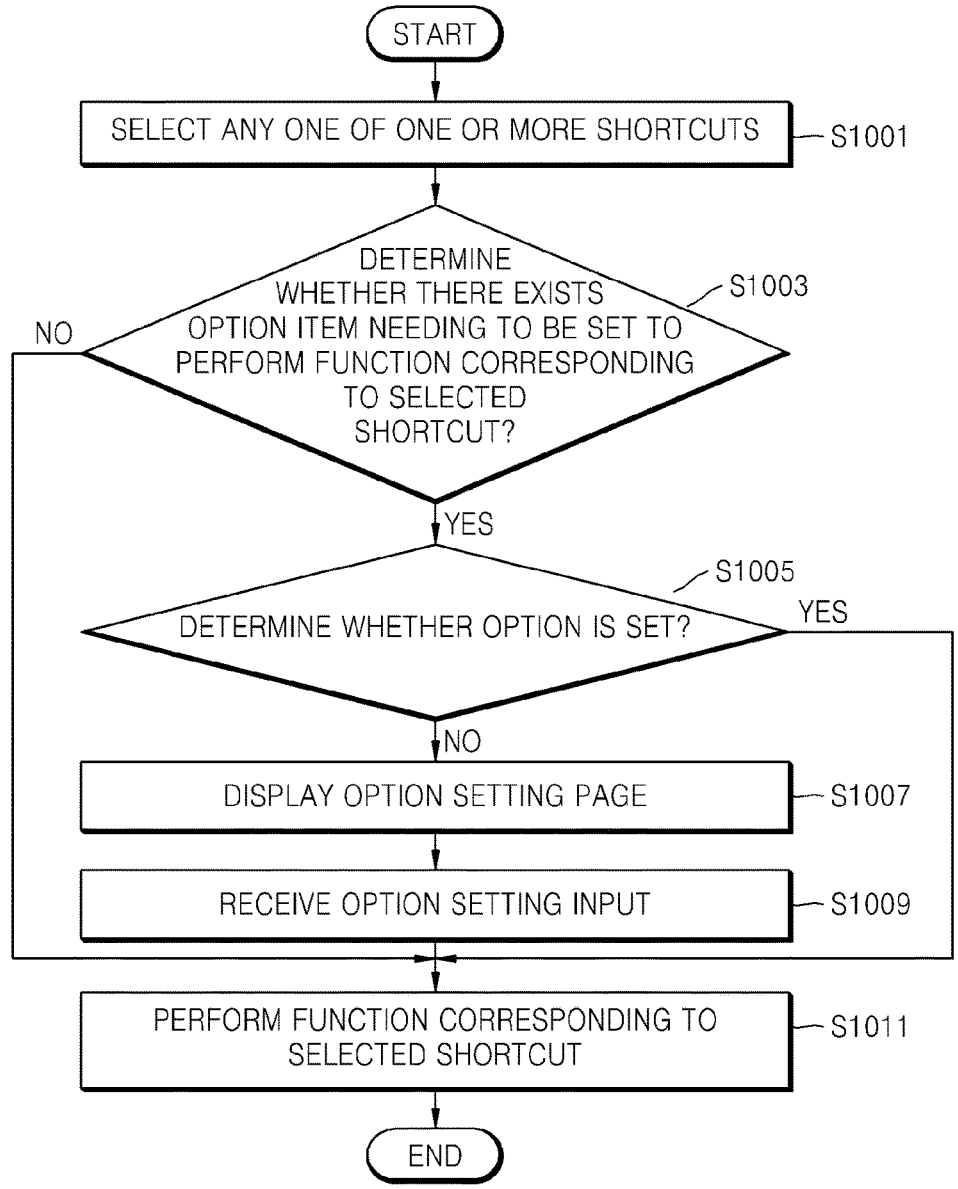
FIGS. 10 through 12 are flowcharts illustrating methods each of which sets an option when a function is performed by using a shortcut, according to embodiments of the present inventive concept.
Figure 11:
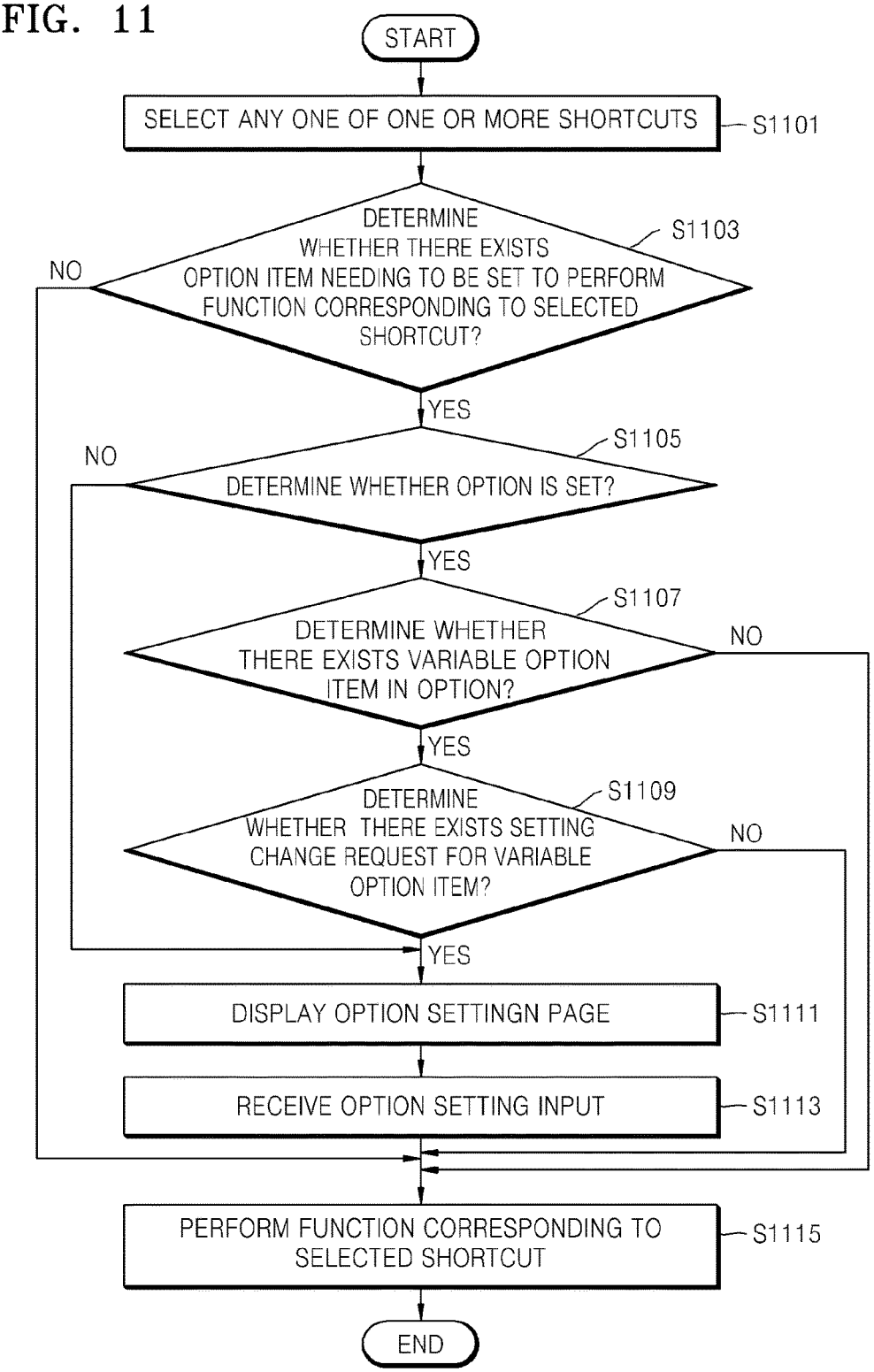
Figure 12:
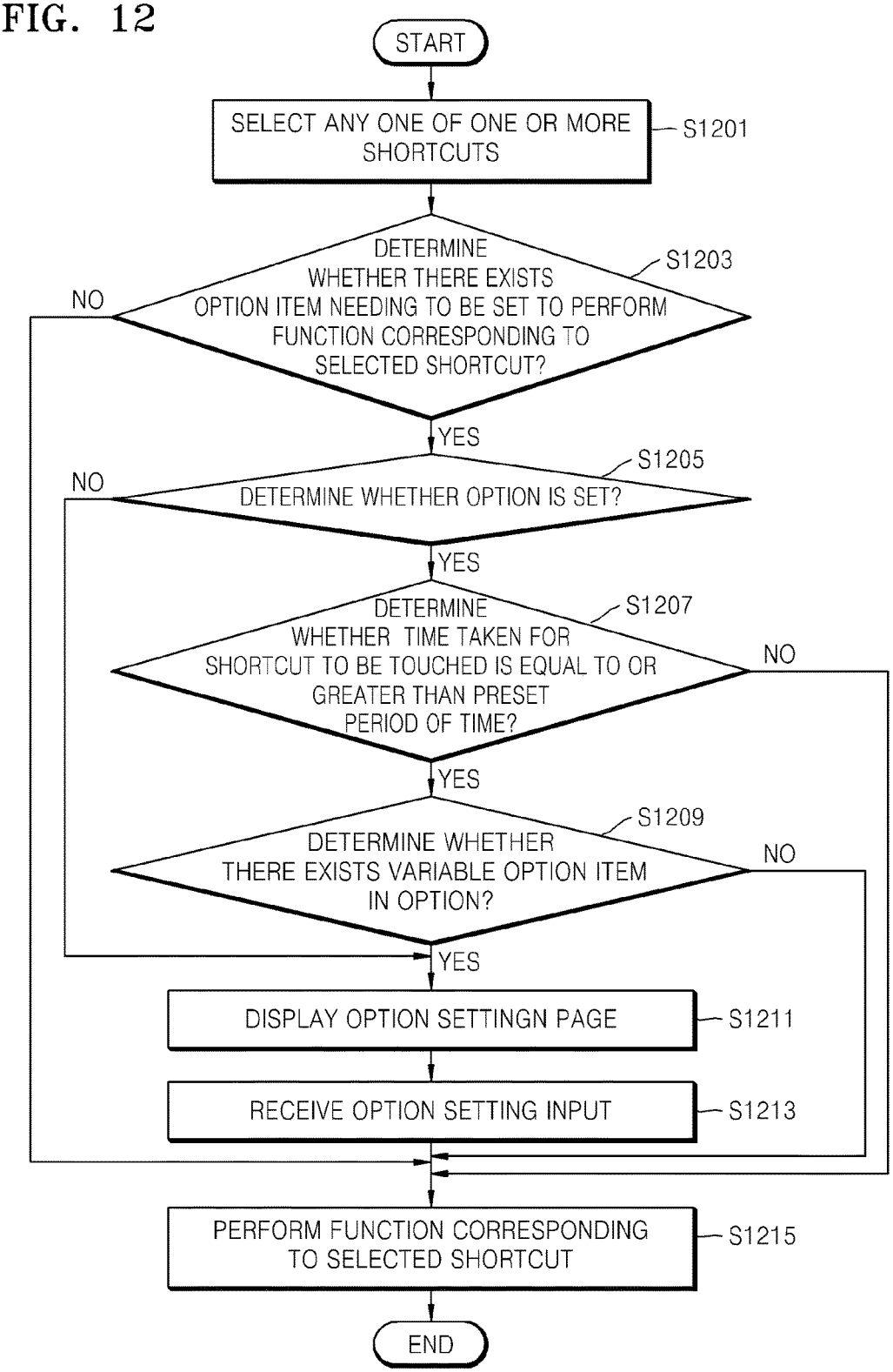

FIGS. 10 through 12 are flowcharts for explaining methods each of which sets an option when a function is performed by using a shortcut, according to embodiments of the present invention. Referring to FIG. 10, in operation S1001, any one of one or more shortcuts is selected by a user. In operation S1003, it is determined whether there exists a need to set an option item to perform a function corresponding to the selected shortcut. When it is determined in operation S1003 that there does not exist the need to set the option item, the method proceeds to operation S1011. In operation S1011, the function corresponding to the selected shortcut is performed. When it is determined in operation S1003 that there exists a need to set the option item, the method proceeds to operation S1005. In operation S1005, it is determined whether an option is set. When it is determined in operation S1005 that the option is set, the method proceeds to operation S1011. In operation S1011, the function corresponding to the selected shortcut is performed. When it is determined in operation S1005 that the option is not set, the method proceeds to operation S1007. In operation S1007, an option setting page is displayed. In operation S1009, it is determined whether an option setting input is received from the user. When it is determined in operation S1009 that the option setting input is received from the user, the method proceeds to operation S1011. In operation S1011, the function corresponding to the selected shortcut is performed. The option set in operation S1009 may be stored as a basic value for the shortcut selected in operation S1001.

Referring to FIG. 11, in operation S1101, any one of one or more shortcuts is selected by a user. In operation S1103, it is determined whether there exists a need to set an option item to perform a function corresponding to the selected shortcut. When it is determined in operation S1103 that there does not exist a need to set the option item, the method proceeds to operation S1115. In operation S1115, the function corresponding to the selected shortcut is performed. When it is determined in operation S1103 that there exits the need to set an option item, the method proceeds to operation S1105. In operation S1105, it is determined whether an option is set. When it is determined in operation S1105 that the option is set, the method proceeds to operation S1107. In operation S1107, it is determined whether there exists a variable option item in the option. When it is determined in operation S1105 that the option is not set, the method proceeds to operation S1111. In operation S1111, an option setting page is displayed. When it is determined in operation S1107 that there does not exist the variable option item in the option, the method proceeds to operation S1115. In operation S1115, the function corresponding to the selected shortcut is performed. When it is determined in operation S1107 that there exists the variable option item, the method proceeds to operation S1109. In operation S1109, it is determined whether there exists a setting change request. When it is determined in operation S1109 that there exists the setting change request, the method proceeds to operation S1111. In operation S1111, the option setting page is displayed. Next, in operation S1113, an option setting input is received from the user. In operation S1115, the function corresponding to the selected shortcut is performed according to the option.

Referring to FIG. 12, in operation S1201, any one of one or more shortcuts is selected by a user. In operation S1203, it is determined whether there exists a need to set an option item to perform a function corresponding to the selected shortcut. When it is determined in operation S1203 that there does not exist a need to set the option item, the method proceeds to operation S1215. In operation S1215, the function corresponding to the selected shortcut is performed. When it is determined in operation S1203 that there exists a need to set an option item, the method proceeds to operation S1205. In operation S1205, it is determined whether an option is set. When it is determined in operation S1205 that the option is set, the method proceeds to operation S1207. In operation S1207, it is determined whether a time taken for the user to touch the shortcut is equal to or greater than a preset determined period of time. When it is determined in operation S1205 that the option is not set, the method proceeds to operation S1211. In operation S1211, an option setting page is displayed. When it is determined in operation S1207 that the time taken for the user to touch the shortcut is less than the preset period of time, the method proceeds to operation S1215. In operation S1215, the function corresponding to the selected shortcut is performed. When it is determined in operation S1207 that the time taken for the user to touch the shortcut is equal to or greater than the preset period of time, the method proceeds to operation S1209. In operation S1209, it is determined whether there exists a variable option item in the option. When it is determined in operation S1209 that there does not exist the variable option item, the method proceeds to operation S1215. In operation S1215, the function corresponding to the selected shortcut is performed. When it is determined in operation S1209 that there exists the variable option item, the method proceeds to operation S1211. In operation S1211, the option setting page is displayed. In operation S1213, an option setting input is received from the user. In operation S1215, the function corresponding to the selected shortcut is performed according to the option.

According various exemplary embodiments of the present inventive concept, even when, for a function that requires an option item to be set, a shortcut is set but an option is not set, the user may perform a function by setting the option on an option setting page displayed subsequently when the shortcut is selected. Accordingly, even when the user does not know a complex method of setting an option, the user may conveniently set the option when selecting a shortcut. Also, although an image forming apparatus manufacturer does not know an option setting value to be set by the user in advance, since a shortcut is set for a function that is expected to be often used when the image forming apparatus is manufactured, user convenience may be improved.

Also, since an option item to perform a function corresponding to a shortcut is designated as a variable option item and the variable option item maybe changed whenever a function is performed by selecting a shortcut, a plurality of users may share the same shortcut and a user interface may be prevented from being complicated when a plurality of similar shortcuts are registered.

As described above, when a shortcut is selected, since a function corresponding to the selected shortcut may be performed directly or a mode in which an option necessary to perform the function corresponding to the selected shortcut is set is entered, a user may conveniently set the option.

Furthermore, assuming that an option necessary to perform a function is not set, when a shortcut corresponding to the function is set and a user selects the shortcut, since the option necessary to perform the function may be set by selecting the shortcut, the user may conveniently use the function of the shortcut.

Also, since an option item is designated as a variable option item that may be changed whenever a function is performed by using a shortcut, a plurality of users may share one shortcut, thereby making it unnecessary to repeatedly set similar shortcuts.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus, comprising:
a user interface to provide one or more shortcuts, each set to correspond to a specific function of the image forming apparatus, to receive an input to selectively designate a set option in an option setting page displayed on the user interface as a variable option for at least one shortcut, and to receive an input to select a shortcut from the one or more shortcuts;
a memory to store shortcut information about functions corresponding to the one or more shortcuts and options related to the functions;
a job executer to perform a function corresponding to the selected shortcut; and
a controller to control the job executer to perform the function corresponding to the selected shortcut by using the shortcut information stored in the memory, wherein when the shortcut is selected:
if an option necessary to perform the function corresponding to the selected shortcut exists and is not set, the controller is to control the user interface to display the option setting page to set the option necessary to perform the function corresponding to the selected shortcut,
if the option necessary to perform the function corresponding to the selected shortcut exists and is set, and if the set option is not designated as the variable option, the controller is to control the job executer to perform the function corresponding to the selected shortcut according to the set option without displaying the option setting page,
if the option necessary to perform the function corresponding to the selected shortcut exists and is set, and if the set option is designated as the variable option and the input to select the shortcut is received for a duration of time less than a predetermined duration of time, the controller is to control the job executer to perform the function corresponding to the selected shortcut according to the set option without displaying the option setting page,
if the option necessary to perform the function corresponding to the selected shortcut exists and is set, and if the set option is designated as the variable option and the input to select the shortcut is received for a duration of time equal to or greater than the predetermined duration of time, the controller is to control the user interface to display the option setting page to change the variable option, and
if the option necessary to perform the function corresponding to the selected shortcut does not exist, the controller is to control the job executer to perform the function corresponding to the selected shortcut without displaying the option setting page.

2. The image forming apparatus of claim 1, wherein the controller is to determine whether the option necessary to perform the function corresponding to the selected shortcut exists, to determine whether the option necessary to perform the function corresponding to the selected shortcut is set by referencing the shortcut information stored in the memory, and to update the shortcut information stored in the memory according to an option setting input received through the user interface.

3. The image forming apparatus of claim 2, wherein the controller is to determine whether the function corresponding to the selected shortcut is a window movement function of the user interface or a job execution function of performing an image forming job, and if the function corresponding to the selected shortcut is the job execution function of performing the image forming job, the controller is to determine that the option necessary to perform the function corresponding to the selected shortcut exists.

4. The image forming apparatus of claim 2, wherein
the controller is to determine whether the option necessary to perform the function corresponding to the selected shortcut is designated as the variable option if the controller determines that the option necessary to perform the function corresponding to the selected shortcut exists and set, and
the controller is to determine whether there exists a setting change request for the variable option based on a duration of time the input to select the shortcut is received, and
the controller is to control the user interface to display the option setting page if the controller determines the setting change request exists.

5. The image forming apparatus of claim 4, wherein
the controller is to determine that the setting change request exists if the duration of time the input to select the shortcut is received is equal to or greater than the predetermined duration of time, and
the input to select is a touch input.

6. The image forming apparatus of claim 4, wherein the user interface is to receive the input to selectively designate the set option in the option setting page displayed on the user interface as the variable option a shortcut is created, and
the controller is to store the shortcut information including the designated variable option for the corresponding shortcut in the memory.

7. The image forming apparatus of claim 4, wherein the user interface is to receive the input to selectively designate each of a plurality options in the option setting page displayed on the user interface as respective variable options.

8. The image forming apparatus of claim 2, wherein
the controller is to determine a duration of time the input to select the shortcut is received and whether the duration of time the input to select the shortcut is received is equal to or greater than the predetermined duration of time, if the controller determines that the option necessary to perform the function corresponding to the selected shortcut exists and is set, and
the controller is to determine whether the set option is designated as the variable option if the duration of time the input to select the shortcut is received is equal to or greater than the predetermined duration of time.

9. The image forming apparatus of claim 1, wherein
the user interface comprises a touch-type display, and
the shortcut is displayed as an icon on the touch-type display.

10. A method comprising:
receiving an input selectively designating a set option in an option setting page displayed on a user interface of an image forming apparatus as a variable option for at least one shortcut;
receiving an input selecting a shortcut from the one or more shortcuts, each of the one or more shortcuts set to correspond to a function of the image forming apparatus; and
selectively displaying the option setting page when the shortcut is selected, such that:

if an option necessary to perform the function corresponding to the selected shortcut exists and is not set, displaying the option setting page to set the option necessary to perform the function corresponding to the selected shortcut, if the option necessary to perform the function corresponding to the selected shortcut exists and is set, and if the set option is not designated as the variable option, performing the function corresponding to the selected shortcut without displaying the option setting page according to the set option, if the option necessary to perform the function corresponding to the selected shortcut exists and is set, and if the set option is designated as the variable option and the input selecting the shortcut is received for a duration of time less than a predetermined duration of time, performing the function corresponding to the selected shortcut according to the set option without displaying the option setting page, if the option necessary to perform the function corresponding to the selected shortcut exists and is set, and if the set option is designated as the variable option and the input selecting the shortcut is received for a duration of time equal to or greater than the predetermined duration of time, displaying the option setting page to change the variable option, and if the option necessary to perform the function corresponding to the selected shortcut does not exist, performing the function corresponding to the selected shortcut without displaying the option setting page.

11. The method of claim 10, further comprising:
determining whether the option necessary to perform the function corresponding to the selected shortcut exists, and if the option necessary to perform the function corresponding to the selected shortcut exists, determining whether the option necessary to perform the function corresponding to the selected shortcut is set.

12. The method of claim 10, further comprising:
determining whether the function corresponding to the selected shortcut is a window movement function of the user interface of the image forming apparatus or a job execution function of performing an image forming job; and if the function corresponding to the selected shortcut is the job execution function of performing the image forming job, determining that the option necessary to perform the function corresponding to the selected shortcut exists and determining whether the option necessary to perform the function corresponding to the selected shortcut is set.

13. The method of claim 10, further comprising:
storing the option as a basic value for the selected shortcut.

14. The method of claim 10, further comprising:
determining whether the option necessary to perform the function corresponding to the selected shortcut exists, and if the option necessary to perform the function corresponding to the selected shortcut exists, determining whether the option necessary to perform the function corresponding to the selected shortcut is set;

if the option necessary to perform the function corresponding to the selected shortcut exists and the option necessary to perform the function corresponding to the selected shortcut is set, determining whether the set option is designated as the variable option;

if the set option is designated as the variable option, determining whether a setting change request for the variable option exists; and if the setting change request exists, displaying the option setting page to change the variable option.

15. The method of claim 14, wherein the determining whether the setting change request for the variable option exists comprises determining that the setting change request exists if the duration of time the input selecting the shortcut is received is equal to or greater than the predetermined duration of time.

16. The method of claim 14, wherein the receiving the input selectively designating the set option in the option setting page displayed on the user interface of the image forming apparatus as the variable option occurs when the corresponding shortcut is created.

17. The method of claim 14, further comprising selectively designating a plurality of options in the option setting page displayed on the user interface as respective variable options.

18. The method of claim 10, further comprising:
determining whether the option necessary to perform the function corresponding to the selected shortcut exists, and if the option necessary to perform the function corresponding to the selected shortcut exists, determining whether the option is set;

if the option necessary to perform the function corresponding to the selected shortcut exists and the option necessary to perform the function corresponding to the selected shortcut is set, determining whether a duration of time the input selecting the shortcut is received is equal to or greater than the predetermined duration of time;

if the duration of time is equal to or greater than the predetermined duration of time, determining whether the set option is designated as the variable option; and if the set option is designated as the variable option, displaying the option setting page to change the variable option.

19. The method of claim 10, wherein the shortcut is an icon displayed on a touch-type display of the image forming apparatus.

20. A non-transitory computer-readable recording medium having embodied thereon a program to execute the method of claim 10.

21. An image forming apparatus, comprising:
a user interface to provide a shortcut region with a plurality of selectable shortcuts each to correspond with a function of the image forming apparatus, and to receive an input to selectively designate a set option in an option setting page displayed on the user interface as a variable option for at least one shortcut;

a job executer to execute a function corresponding to a selected shortcut; and a controller to, when the shortcut is selected, determine whether an option necessary to perform the function corresponding to a selected shortcut exists, and to selectively control the user interface to display the option setting page to set the option necessary to perform the function corresponding to the selected shortcut or control the job executer to perform the function corresponding to the selected shortcut without displaying the option setting page, based on the determination whether the option necessary to perform the function corresponding to the selected shortcut exists and based on whether the option necessary to perform the function corresponding to the selected shortcut is set if the option necessary to perform the function corresponding to the selected shortcut exists, such that
- if the option necessary to perform the function corresponding to the selected shortcut exists and is not set, the controller is to control the user interface to display the option setting page to set the option necessary to perform the function corresponding to the selected shortcut,
- if the option necessary to perform the function corresponding to the selected shortcut exists and is set, the controller is to control the job executer to perform the function corresponding to the selected shortcut according to the set option without displaying the option setting page if the set option is not designated as the variable option,
- if the option necessary to perform the function corresponding to the selected shortcut exists and is set, the controller is to control the job executer to perform the function corresponding to the selected shortcut according to the set option without displaying the option setting page if the set option is designated as the variable option and the input to select the shortcut is received for a duration of time less than a predetermined duration of time,
- if the option necessary to perform the function corresponding to the selected shortcut exists and is set, the controller is to control the user interface to display the option setting page to change the variable option if the set option is designated as the variable option and the input to select the shortcut is received for a duration of time equal to or greater than the predetermined duration of time, and
- if the option necessary to perform the function corresponding to the selected shortcut does not exist, the controller is to control the job executer to perform the function corresponding to the selected shortcut without displaying the option setting page.

22. The image forming apparatus of claim 21, further comprising:
- a memory to store shortcut information about functions corresponding to plurality of selectable shortcuts and options related to the functions.

23. The image forming apparatus of claim 21, wherein
- the controller is to determine whether the option necessary to perform the function corresponding to the selected shortcut is set,
- the controller is to determine whether the set option is designated as the variable option if the controller determines the option necessary to perform the function corresponding to the selected shortcut is set, and
- the controller is to determine whether a setting change request for the variable option exists if the controller determines that the set option is designated as the variable option.

24. The image forming apparatus of claim 23, wherein
- the setting change request is made when the input to select the shortcut is received for a duration of time equal to or greater than the predetermined duration of time, and
- the input to select the shortcut is made by a touch input.

25. The image forming apparatus of claim 23, wherein
- the controller is to control the user interface to display the option setting page, and
- when an option setting input is received through the user interface from the user, the controller is to change a setting of the option according to the option setting input, and is to control the job executer to perform a function corresponding to the selected shortcut.

26. The image forming apparatus of claim 21, wherein
- the controller is to determine whether the option necessary to perform the function corresponding to the selected shortcut is set,
- the controller is to determine whether a setting change request exists based on a duration of time the input to select the shortcut is received if the controller determines that the option necessary to perform the function corresponding to the selected shortcut is set, and
- the controller is to determine whether the set option is designated as the variable option if the controller determines that the duration of time the input to select the shortcut is received is equal to or greater than the predetermined duration.

* * * * *

UNITED STATES PATENT AND TRADEMARK OFFICE
CERTIFICATE OF CORRECTION

| | | |
|---|---|---|
| PATENT NO. | : 10,048,846 B2 | Page 1 of 1 |
| APPLICATION NO. | : 13/912452 | |
| DATED | : August 14, 2018 | |
| INVENTOR(S) | : Tae-gyun Cho | |

It is certified that error appears in the above-identified patent and that said Letters Patent is hereby corrected as shown below:

In the Drawings

In sheet 15 of 16, FIG. 11, reference numeral S1111, delete "SETTINGN" and insert -- SETTING --, therefor.

In sheet 16 of 16, FIG. 12, reference numeral S1211, delete "SETTINGN" and insert -- SETTING --, therefor.

In the Claims

In Column 14, Line 16, Claim 4, after "and" insert -- is --.

In Column 14, Line 29, Claim 5, after "select" insert -- the shortcut --.

In Column 14, Line 33, Claim 6, after "option" insert -- when --.

In Column 14, Line 57, Claim 10, delete "method" and insert -- method, --, therefor.

Signed and Sealed this
Twenty-fifth Day of December, 2018

Andrei Iancu
*Director of the United States Patent and Trademark Office*